US012699278B2

(12) United States Patent
Ouyang et al.

(10) Patent No.: US 12,699,278 B2
(45) Date of Patent: Aug. 4, 2026

(54) FOLDED OPTICS CAMERA WITH TILT ACTUATOR

(71) Applicant: Apple Inc., Cupertino, CA (US)

(72) Inventors: Jian Ouyang, San Jose, CA (US);
Nicholas D. Smyth, San Jose, CA
(US); Scott W. Miller, Los Gatos, CA
(US)

(73) Assignee: Apple Inc., Cupertino, CA (US)

( * ) Notice: Subject to any disclaimer, the term of this patent is extended or adjusted under 35 U.S.C. 154(b) by 269 days.

(21) Appl. No.: 18/452,421

(22) Filed: Aug. 18, 2023

(65) Prior Publication Data

US 2023/0393412 A1      Dec. 7, 2023

Related U.S. Application Data

(63) Continuation of application No. 17/187,416, filed on Feb. 26, 2021, now Pat. No. 11,762,217.

(60) Provisional application No. 62/982,543, filed on Feb. 27, 2020.

(51) Int. Cl.
| | |
|---|---|
| *G02B 27/64* | (2006.01) |
| *G02B 7/182* | (2021.01) |
| *G02B 13/00* | (2006.01) |
| *G02B 26/08* | (2006.01) |

(52) U.S. Cl.
CPC ......... *G02B 27/646* (2013.01); *G02B 7/1828* (2013.01); *G02B 13/0065* (2013.01); *G02B 26/0816* (2013.01)

(58) Field of Classification Search
CPC ............ G02B 7/18–1828; G02B 27/64; G02B 27/646; G02B 13/001–006; G02B 26/0816
See application file for complete search history.

(56) References Cited

U.S. PATENT DOCUMENTS

| | | | |
|---|---|---|---|
| 10,416,473 B2 | 9/2019 | Lee et al. | |
| 2019/0049687 A1 | 2/2019 | Bachar et al. | |
| 2019/0129197 A1 | 5/2019 | Kim et al. | |
| 2019/0377155 A1 | 12/2019 | Bachar et al. | |
| 2020/0363626 A1* | 11/2020 | Seo ........................ | G03B 30/00 |

(Continued)

FOREIGN PATENT DOCUMENTS

WO          2019207464          10/2019

OTHER PUBLICATIONS

U.S. Appl. No. 17/187,416, filed Feb. 26, 2021, Jian Ouyang et al.

*Primary Examiner* — Cara E Rakowski
(74) *Attorney, Agent, or Firm* — Robert C. Kowert; Kowert, Hood, Munyon, Rankin & Goetzel, P.C.

(57) ABSTRACT

Various embodiments include a camera with folded optics and a tilt actuator. In some embodiments, the camera may include a folded optics arrangement that may include a prism and a lens group. In some embodiments, an actuator arrangement of the camera may include one or more actuators for tilting the prism about multiple axes. Furthermore, the actuator arrangement may include one or more actuators for translating the lens group along an axis. In some embodiments, the camera may include a bearing suspension arrangement that may allow for controlled movement of the prism and/or the lens group according to the motion enabled by the actuator arrangement.

20 Claims, 15 Drawing Sheets

(56) References Cited

U.S. PATENT DOCUMENTS

2021/0199983 A1    7/2021   Kazuo
2022/0279125 A1    9/2022   Jang

* cited by examiner

*Portable Multifunction Device 1000*

| 1106 | 1110 | 1112 |

Speaker
*1011*

Optical Sensors
/Cameras
*1064*

Proximity Sensor
*1066*

*1108*

*1108*

1110 is SIM card slot
1112 is headphone jack

—1100

*1102*

Touch
Screen
*1012*

1103—

Microphone
*1013*

Home
*1104*

Accelerometer(s)
*1068*

External Port
*1124*

FOLDED OPTICS CAMERA WITH TILT ACTUATOR

This application is a continuation of U.S. patent application Ser. No. 17/187,416, filed Feb. 26, 2021, which claims benefit of priority to U.S. Provisional Application Ser. No. 62/982,543, entitled "Folded Optics Camera with Tilt Actuator," filed Feb. 27, 2020, and which are incorporated herein by reference in their entirety.

BACKGROUND

Technical Field

This disclosure relates generally to architecture for a camera with folded optics and a tilt actuator.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIG. 4A shows a perspective view of the bearing suspension arrangement. FIG. 4B shows a side cross-sectional view of the bearing suspension arrangement.

FIG. 5A shows the flex circuit in a flat state. FIG. 5B shows the flex circuit arrangement in a folded state.

Figure 1:
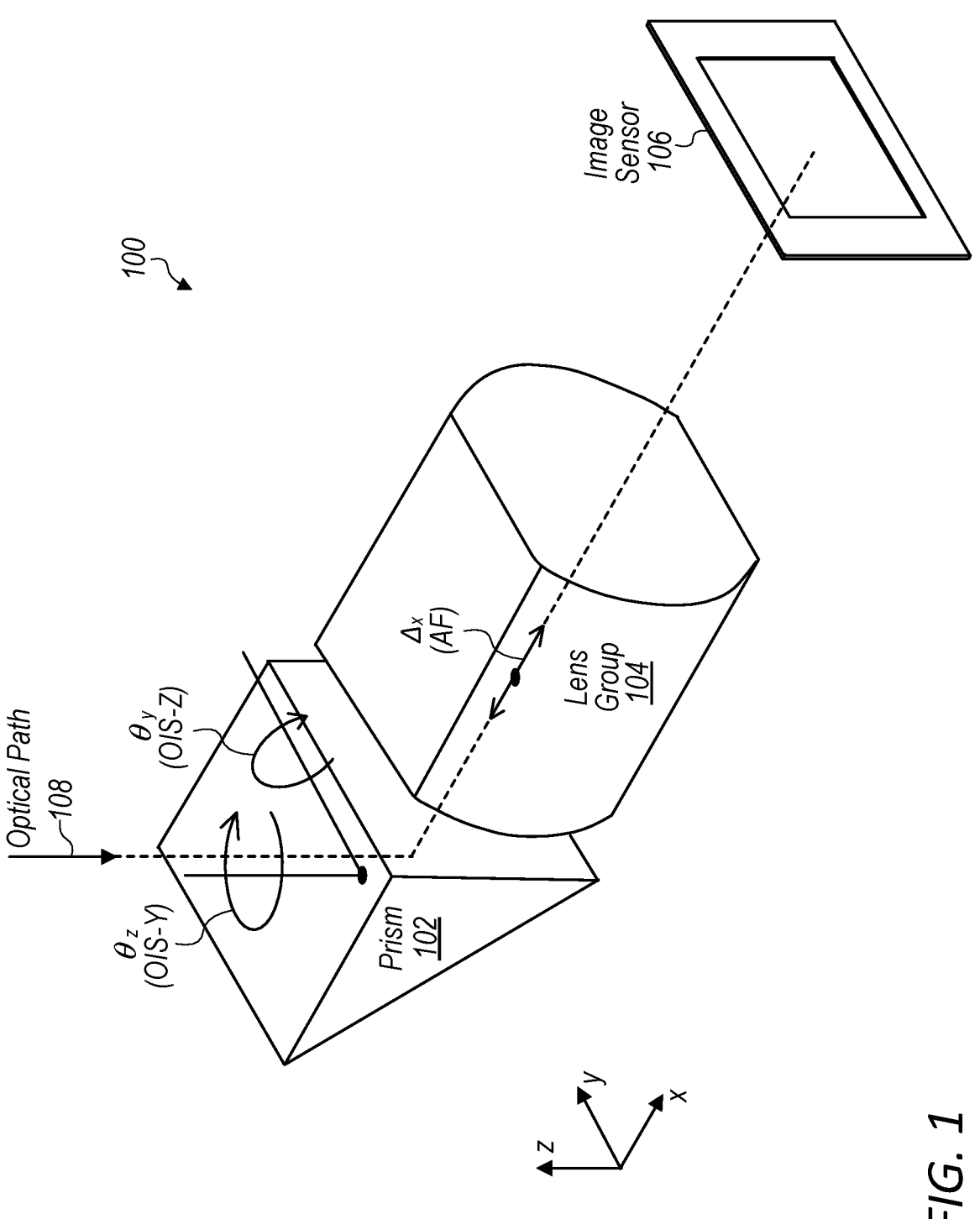
FIG. 1 illustrates a perspective view of an example folded optics arrangement that may be included in a camera configured with a tilt actuator, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Some embodiments include camera equipment outfitted with controls, magnets, and voice coil motors to improve the effectiveness of a miniature actuation mechanism for a compact camera module. More specifically, in some embodiments, compact camera modules include actuators to deliver functions such as autofocus (AF) and/or optical image stabilization (OIS). One approach to delivering a very compact actuator for AF and/or OIS is to use a voice coil motor (VCM) actuator.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Described herein are embodiments of a camera with folded optics and a tilt actuator. The arrangements discussed throughout generally comprise one or more lenses positioned between a light path folding element and an image sensor. The light path folding element and/or the one or more lenses may be moveable to provide optical image stabilization (OIS) and/or autofocus (AF) during imaging. FIG. 1 shows a generalized example of a camera 100 with a folded optics arrangement. The example X-Y-Z coordinate system shown in FIG. 1 is used to discuss aspects of embodiments described throughout this disclosure.

In various embodiments, the camera 100 may include a light path folding element (e.g., prism 102), a lens group 104, and an image sensor 106 (and/or an image sensor package). The lens group 104 may include one or more lens elements. In some embodiments, the lens group 104 may be located between the prism 102 and the image sensor 106. The prism 102 and the lens group 104 may form a folded optics arrangement (e.g., a single fold optics arrangement as indicated in FIG. 1) through which light passes before reaching the image sensor 106. Light may follow an optical path 108 that is folded by prism 102 such that the light is directed towards the lens group 104, passes through the lens group 104, and then reaches the image sensor 106. In some examples, light may enter an object side of the prism 102 along the Z-axis. The prism 102 may redirect the light to propagate along the X-axis (which may be parallel to an optical axis defined by the lens group 104), e.g., such that the light exits an lens group facing side of the prism 102 towards the lens group 104. The light may pass through the lens group 104 and continue propagating along the X-axis towards the image sensor 106 (which may be vertically oriented, e.g., such that the image sensor 106 defines a plane that is orthogonal to the X-axis and/or the optical axis defined by the lens group 104). The prism 102, the lens group 104, and/or the image sensor 106 may be positioned along a common axis (e.g., the X-axis, the optical axis defined by the lens group 104, etc.). According to some examples, the optical path 108 may be contained within a plane (e.g., the X-Z plane), and the image sensor 106 may extend along a different plane (e.g., the Y-Z plane).

In some embodiments, the object side of the prism 102 may extend along the X-Y plane. Furthermore, the prism 102 may include a pair of opposing lateral sides that each extend along the X-Z plane, a lens group facing side that extends along the Y-Z plane, and a reflecting surface side that is angled relative to one or more of the other sides of the prism 102. For example, the reflecting surface side of the prism 102 may include a reflective surface that is angled so as to redirect light received from the object side of the prism 102 towards the lens group 104 (via the lens group facing side of the prism 102) and the image sensor 106, as discussed above.

While the light path folding elements are shown in various figures as comprising a prism (e.g., the prism 102), the camera systems and/or folded optics arrangements described herein may include any suitable light path folding element (e.g., a mirror or the like) or combination of elements. In some embodiments, a light path folding element may also act as a lens element (or combination of lens elements). For example, one or more lens elements (e.g., other than those of the lens group 104) may be integrated with the prism 102 such that the prism 102 acts as a lens element. Additionally, or alternatively, the prism 102) may be shaped such that the prism acts as a lens element.

In various embodiments, the prism 102 and/or the lens group 104 may be coupled with one or more actuators (e.g., as discussed herein with reference to at least FIGS. 2-8A and 9) configured to move the prism 102 and/or the lens group 104 to provide optical image stabilization (OIS) and/or autofocus (AF) functionality. For example, the prism 102 may be coupled with actuator(s) configured to tilt or otherwise move the prism 102. As indicated in FIG. 1, in various embodiments the actuator(s) may be configured to tilt the prism 102 about multiple axes to provide OIS functionality. In some embodiments, the actuator(s) may tilt the prism 102 about the Z-axis (tilt indicated in FIG. 1 as $\theta_z$) to provide OIS-Y movement (e.g., movement that shifts the image projected onto the image sensor 106 in one or more directions parallel to the Y-axis). Additionally, or alternatively, the actuator(s) may tilt the prism 102 about the Y-axis (tilt indicated in FIG. 1 as $\theta_y$) to provide OIS-Z movement (e.g., movement that shifts the image projected onto the image sensor 106 in the Z-axis). In various embodiments, the actuator(s) may be configured to translate or otherwise move the lens group 104. For example, the actuator(s) may linearly translate the lens group 104 along the X-axis (translation indicated in FIG. 1 as $\Delta_x$) to provide AF movement.

Figure 2:
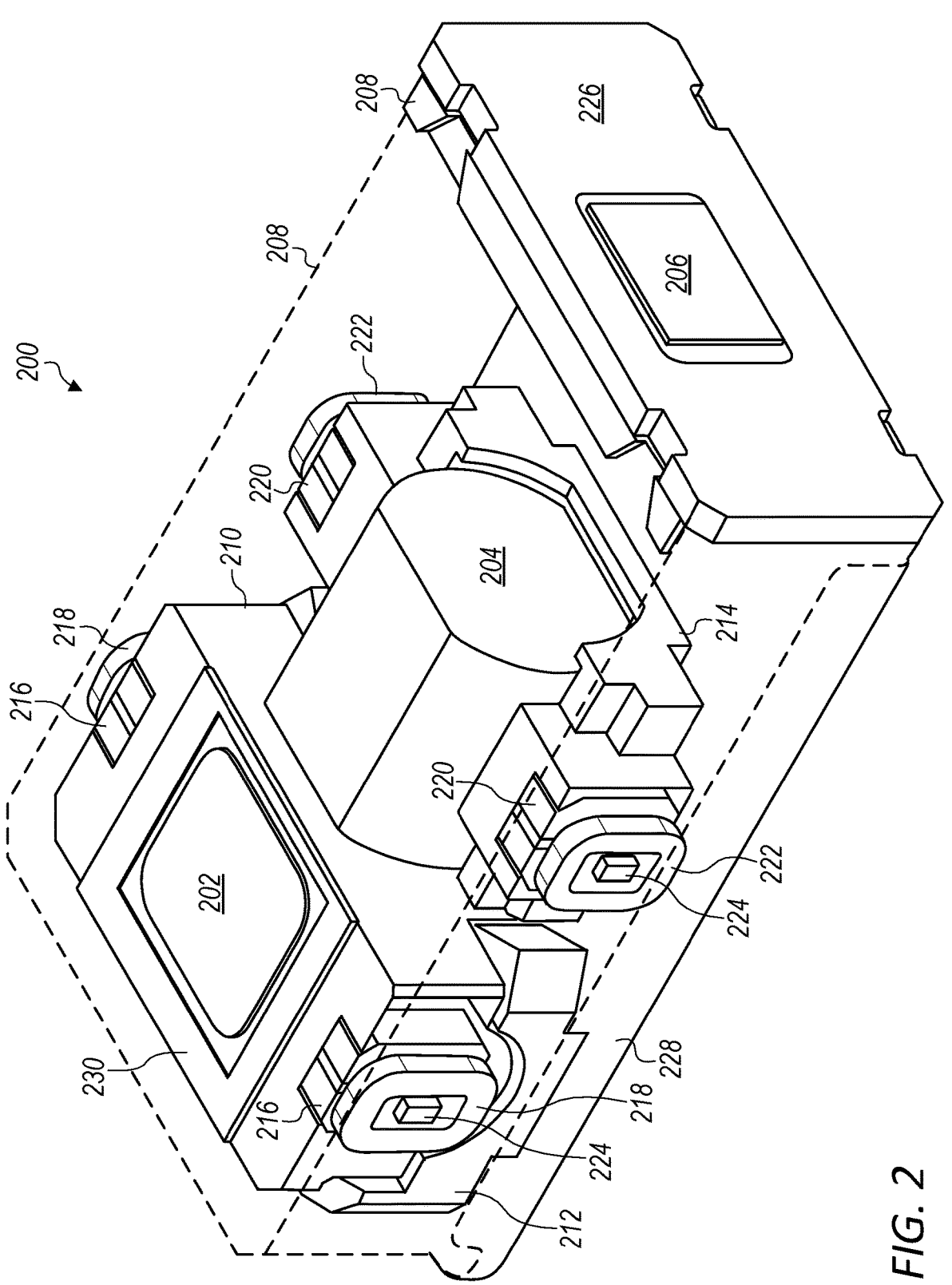
FIG. 2 illustrates a perspective view of an example camera with folded optics and a tilt actuator, in accordance with some embodiments.

FIG. 2 illustrates a perspective view of an example camera 200 with folded optics and a tilt actuator. As will be discussed in further detail below, the camera 200 may include actuators that enable optical elements to move to provide OIS and/or AF functionality, e.g., as indicated with reference to the camera 100 in FIG. 1.

According to some embodiments, the camera 200 may include a prism 202, a lens group 204 (which may include one or more lenses, e.g., within a lens barrel), and an image sensor 206 (and/or image sensor package). In various embodiments, the prism 202, the lens group 204, and the image sensor 206 may form a folded optics arrangement that may be similar to, or the same as, the folded optics arrangement formed by the prism 102, the lens group 104, and the image sensor 106, respectively, in FIG. 1.

In various embodiments, the camera 200 may include a bearing suspension arrangement and/or an actuator arrangement that may be used for controlled movement of one or more light path folding elements (e.g., prism 202) and/or the lens group 204. In some embodiments, the bearing suspension arrangement may include a base structure 208, a Y stage 210, a Z stage 212, and/or an X stage 214. The base structure 208 (and/or the image sensor 206) may be in a fixed position relative to movement of the Y stage 210, a Z stage 212, and/or an X stage 214. The bearing suspension arrangement may be coupled with the prism 202 and/or the lens group 204, and may allow the prism 202 and the lens group 204 to move in multiple directions relative to the image sensor 206. For example, the prism 202 may be coupled with the Y stage 210 and the Z stage 212, which may enable movement of the prism 202 in two degrees of freedom (2DOF). Additionally, or alternatively, the lens group 204 may be coupled with the X stage 214, which may enable movement of the lens group 204 in one degree of freedom (1DOF).

Figure 4A:
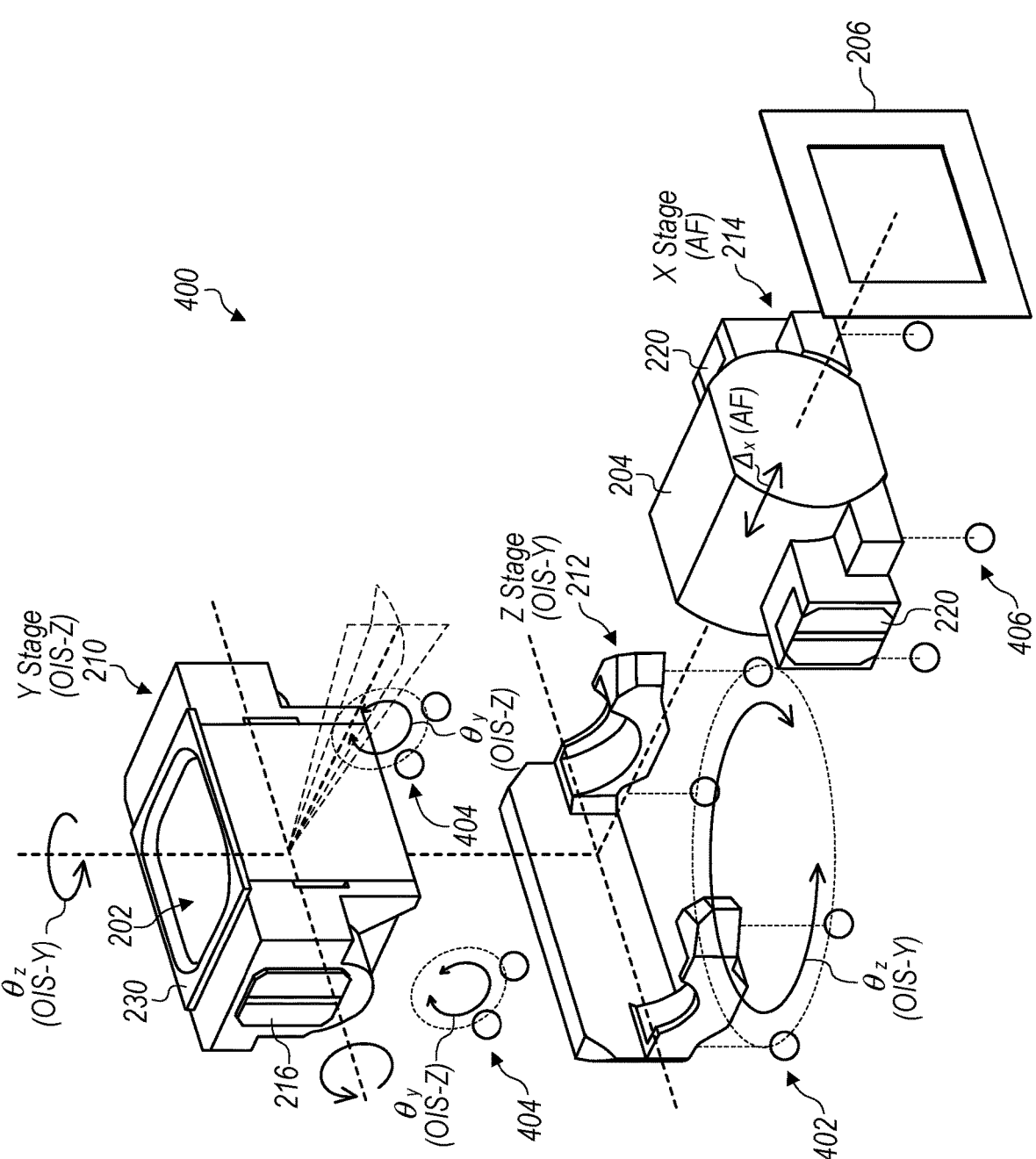
FIGS. 4A-4B illustrate views of an example bearing suspension arrangement that may be included in a camera with folded optics and a tilt actuator, in accordance with some embodiments.
Figure 4B:
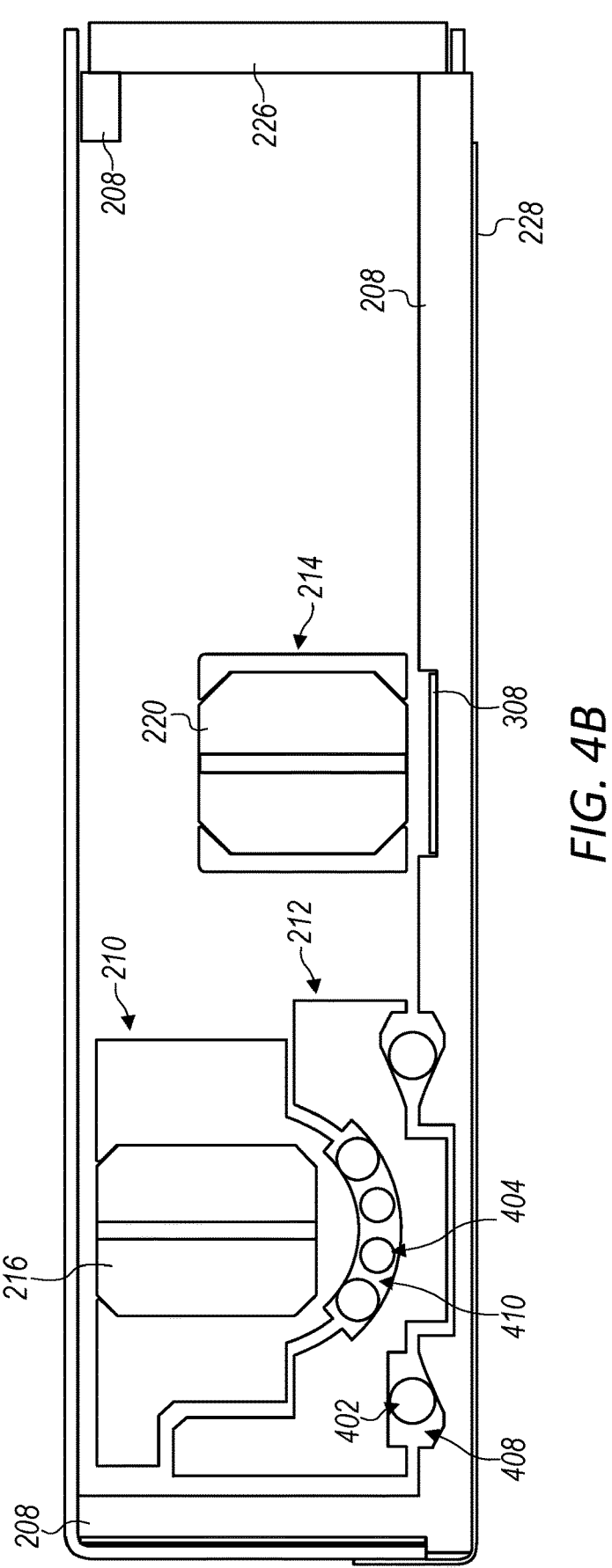

In some embodiments, the Z stage 212 may rest on (or otherwise be disposed above) a floor portion of the base structure 208, and may be configured to tilt (and/or rotate) about the Z-axis, e.g., via Z-tilt ball bearings disposed between the Z stage and the floor portion of the base structure 208, as discussed in further detail herein with reference to FIGS. 4A-4B. According to some examples, the Z-axis tilt movement may be used to provide the OIS-Y movement previously mentioned with reference to FIG. 1.

In some embodiments, the Y stage 210 may rest on (or otherwise be disposed above) the Z stage 212, and may be configured to tilt (and/or rotate) about the Y-axis, e.g., via Y-tilt ball bearings disposed between the Y stage 210 and the Z stage 212, as discussed in further detail herein with reference to FIGS. 4A-4B. According to some embodiments, the Y-axis tilt movement may be used to provide the OIS-Z movement previously mentioned with reference to FIG. 1.

Furthermore, in some embodiments, the Y stage 210 may be configured to tilt about the Z-axis together with the Z stage 212, e.g., due to Z-axis tilt movement of the Z stage 212. According to various embodiments, the prism 202 may be coupled to the Y stage 210, e.g., such that the prism 202 moves together with the Y stage 212.

In some embodiments, the X stage 214 may rest on (or otherwise be disposed above) a floor portion of the base structure 208, and may be configured to translate along the X-axis, e.g., via X-translation ball bearings disposed between the X stage 214 and the floor portion of the base structure 208, as discussed in further detail herein with reference to FIGS. 4A-4B. According to some embodiments, the X-axis translation movement may be used to provide the AF movement previously mentioned with reference to FIG. 1. In various embodiments, the lens group 204 may be coupled to the X stage 214, e.g., such that the lens group 204 moves together with the X stage 214.

In various embodiments, the actuator arrangement may provide for moving the prism 202 and/or the lens group 204 (e.g., via movement of the Y stage 210, the Z stage 212, and/or the X stage 214, as described herein) to provide OIS and/or AF movement. In some embodiments, the actuator arrangement may comprise one or more voice coil motor (VCM) actuators. The VCM actuator(s) may include one or more magnets and one or more coils. The magnets and coils may magnetically interact (e.g., when electrical current is provided to the coils) to produce Lorentz forces that move the prism 202 and/or the lens group 204, e.g., via controlled movement in directions allowed by the stages of the bearing suspension arrangement.

In some embodiments, the actuator arrangement may include an OIS-Z VCM actuator (e.g., to provide OIS-Z movement), an OIS-Y movement (e.g., to provide OIS-Y movement), and an AF actuator (e.g., to provide AF movement). For example, the OIS-Z VCM actuator may include one or more OIS-Z magnets 216 and one or more OIS-Z coils 218, e.g., as indicated in FIG. 2. The OIS-Z magnet(s) 216 may be attached to the Y stage 210. Furthermore, the OIS-Z coil(s) 218 may be coupled with the base structure 208 (e.g., at lateral side portion(s) of the base structure 208). In some embodiments, the OIS-Z coil(s) 218 may be attached to the base structure 208. In some embodiments, the OIS-Z coil(s) 218 may be coupled with the base structure 208 via a flex circuit (e.g., the flex circuit 502 in FIGS. 5A-5B and 9). An OIS-Z magnet 216 and a corresponding OIS-Z coil 218 may be positioned proximate one another so that they magnetically interact with each other to tilt the prism 202 together with the Y stage 210 about Y-axis, to provide OIS-Z movement.

Figure 3:
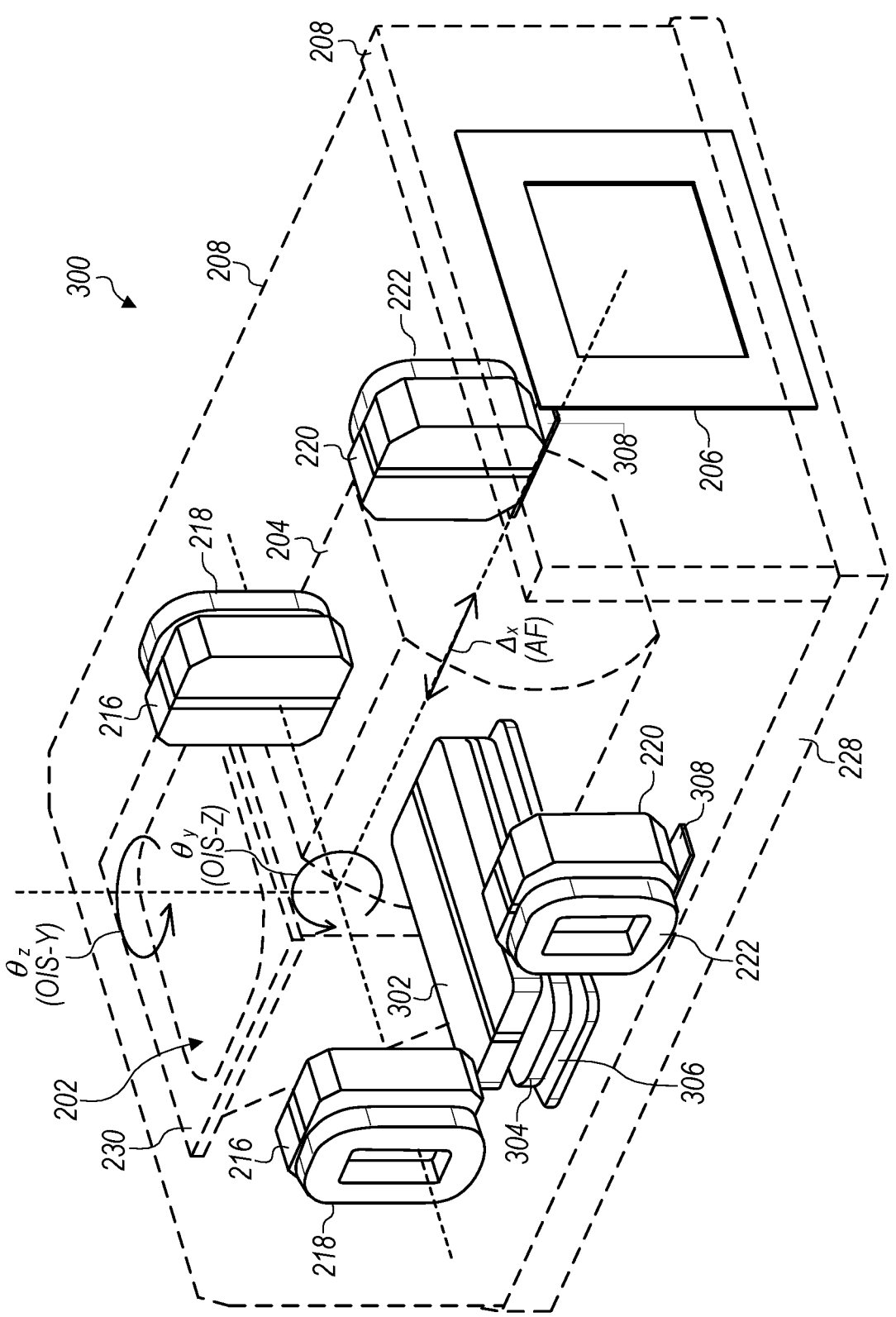
FIG. 3 illustrates a perspective view of an example actuator arrangement that may be included in a camera with folded optics and a tilt actuator, in accordance with some embodiments.

In some embodiments, the OIS-Y VCM actuator may include one or more OIS-Y magnets (e.g., OIS-Y magnets 302 in FIG. 3) and one or more OIS-Y coils (e.g., OIS-Y coils 304 in FIG. 3), e.g., below the prism 202 as indicated in FIG. 3. The OIS-Y magnet(s) may be attached to the Y stage 210 (e.g., a bottom portion and/or underside of the Y stage 210 that faces the floor portion of the base structure 208) and/or to the Z stage 212 (e.g., a bottom portion of the Z stage 212 that faces the floor portion of the base structure 208). Furthermore, the OIS-Y coil(s) may be coupled with the base structure 208 (e.g., a floor portion of the base structure 208). In some embodiments, the OIS-Y coil(s) may be attached to the floor portion of the base structure 208. In some embodiments, the OIS-Y coil(s) may be coupled with the base structure 208 via a flex circuit (e.g., the flex circuit 502 in FIGS. 5A-5B and 9). An OIS-Y magnet and a corresponding OIS-Z coil may be positioned proximate one another so that they magnetically interact with each other to tilt the prism 202 together with the Z stage 212 and the Y stage 210 about Z-axis, to provide OIS-Y movement.

In some embodiments, the AF VCM actuator may include one or more AF magnets 220 and one or more AF magnets 222, e.g., as indicated in FIG. 2. The AF magnet(s) 220 may be attached to the X stage 214. Furthermore, the AF coil(s) 222 may be coupled with the base structure 208 (e.g., at lateral side portion(s) of the base structure 208). In some embodiments, the AF coil(s) 222 may be attached to the lateral side portion(s) of the base structure 208. In some embodiments, the AF coil(s) 222 may be coupled with the base structure 208 via a flex circuit (e.g., the flex circuit 502 in FIGS. and 9). An AF magnet 220 and a corresponding AF coil 222 may be positioned proximate one another so that they magnetically interact with each other to translate the lens group 204 together with the X stage 214 along the X-axis, to provide AF movement.

Figures 5A, 5B:
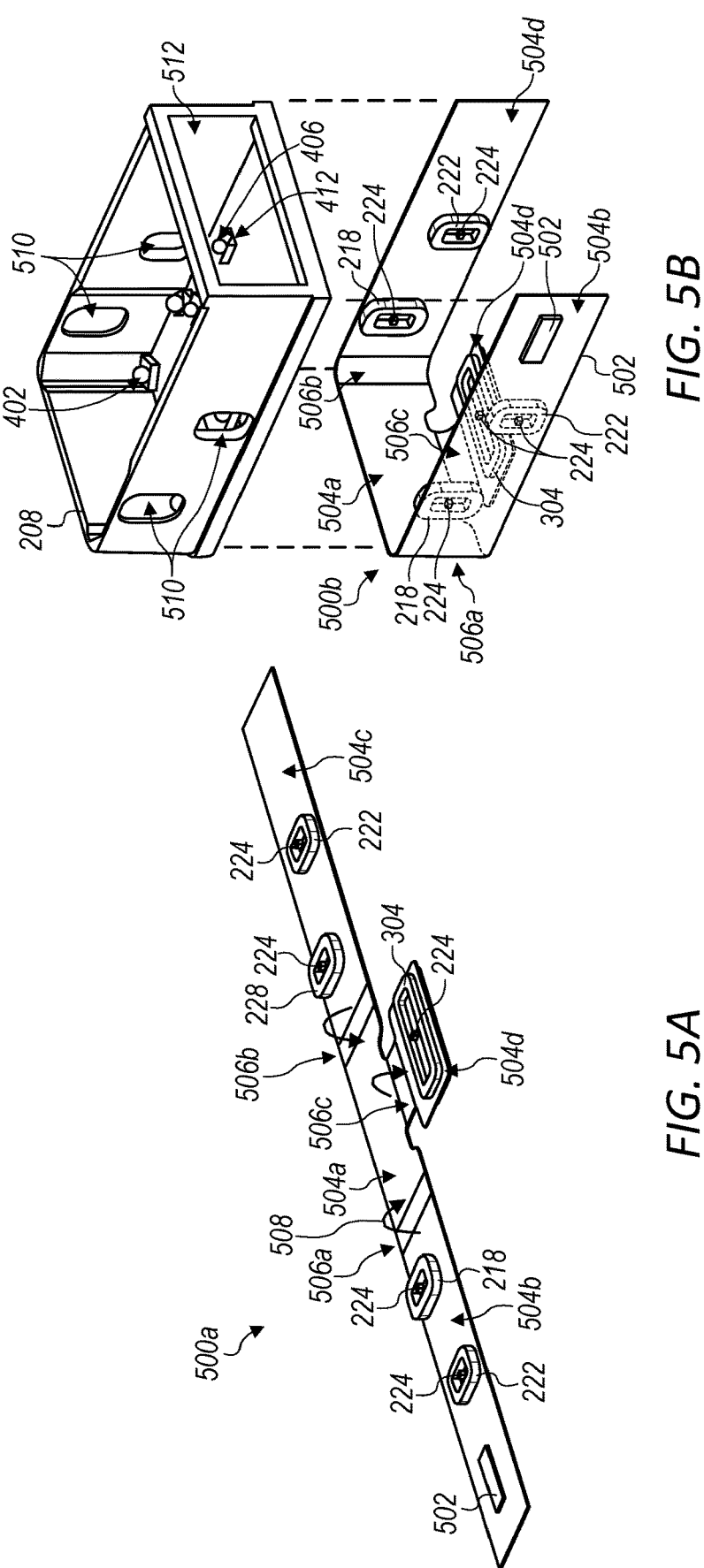
FIGS. 5A-5B illustrate views of an example voice coil motor (VCM) actuator arrangement on a flex circuit that may be included in a camera with folded optics and a tilt actuator, in accordance with some embodiments.

In some embodiments, the camera 200 may include a position sensor arrangement that includes one or more position sensors 224 for position sensing with respect to OIS-Z movement, OIS-Y movement, and/or AF movement. The position sensor(s) 224 may be magnetic field sensors (e.g., Hall sensors, tunneling magnetoresistance (TMR) sensors, giant magnetoresistance (GMR) sensors, etc.) in various embodiments. In some embodiments, a respective position sensor 224 may be located proximate each respective coil of the actuator arrangement. For example, each position sensor 224 may be encircled by a respective coil, as indicated in FIGS. 2 and 5A-5B.

In some embodiments, the base structure 208 may be configured to be packaged around an optical payload (e.g., the folded optics arrangement) on multiple sides. According to some embodiments, one or more other components may be coupled to the base structure 208, such as a shield can (e.g., the shield can 802a in FIG. 8A, the shield can 802b in FIGS. 8B-8D, etc.), a substrate 226 coupled with the image sensor 206, and/or a stiffener 228, etc. The substrate 226 may be configured to hold or otherwise support the image sensor 206.

In some embodiments, the camera 200 may include a cover plate 230 that covers at least a portion of the prism 202. For example, the cover plate 230 may cover a portion of the object side of the prism 202 (the side through which light enters the prism 202). The cover plate 230 may define an aperture that allows light to pass through the cover plate 230 and enter the prism 202.

FIG. 3 illustrates a perspective view of an example actuator arrangement that may be included in a camera 300 with folded optics and a tilt actuator. In some embodiments, the actuator arrangement and/or one or more other components of the camera 300 may be similar to, or the same as, the actuator arrangement and/or one or more other components of the camera 200 in FIG. 2. For example, the actuator arrangement may include the OIS-Z VCM actuator, the OIS-Y VCM actuator, and the AF VCM actuator discussed above with reference to FIG. 2 in some embodiments.

According to some embodiments, the OIS-Z VCM actuator may include a first magnet-coil pair and a second magnet-coil pair at opposite sides of the prism 202, e.g., between a respective side of the prism 202 and a respective lateral side of the base structure 208. Each magnet-coil pair may include, e.g., an OIS-Z magnet 216 attached to a side of the Y stage 210, and a corresponding OIS-Z coil 218 coupled with a corresponding lateral side of the base structure 208. In some embodiments, at least a portion of the OIS-Z magnet 216 may be disposed within a recess defined by the Y stage 210, e.g., as indicated in FIG. 2. In some embodiments, the OIS-Z magnet 216 may be a dual-pole magnet. However, the OIS-Z VCM actuator may additionally, or alternatively, include one or more other types of magnets (e.g., single-pole magnet(s)) in various embodiments. In some embodiments, each of the OIS-Z magnet 216 and the OIS-Z coil 218 may have a respective longest dimension that is parallel to the Z-axis. In some embodiments, the OIS-Z coil 218 may be oriented such that current flows through the coil in directions along a plane parallel to the X-Z plane.

Figure 9:
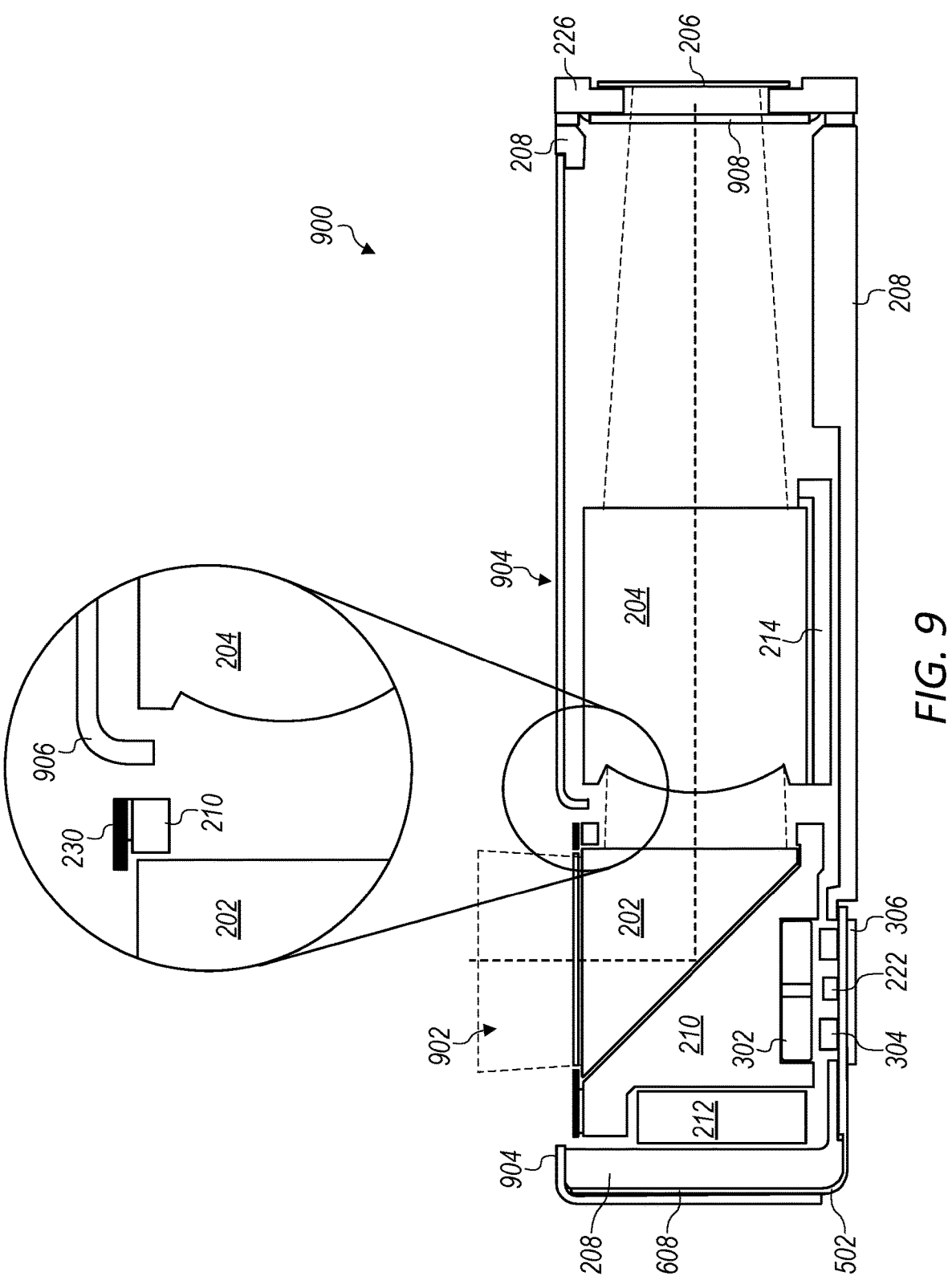
FIG. 9 illustrates a side cross-sectional view of an example camera with folded optics and a tilt actuator, in accordance with some embodiments.

According to some embodiments, the OIS-Y VCM actuator may include an OIS-Y magnet 302 and an OIS-Y coil 304 located below the prism 202. In some embodiments, the OIS-Y magnet 302 may be attached to an underside of the Y stage 210 (e.g., see FIG. 9), and the OIS-Y coil 304 may be coupled with the base structure 208 (e.g., at a floor portion of the base structure 208). In some embodiments, at least a portion of the OIS-Y magnet 302 may be disposed within a recess defined by the Y stage 210, e.g., as indicated in FIG. 9. In some embodiments, the OIS-Y magnet 302 may be a dual-pole magnet. However, the OIS-Y VCM actuator may additionally, or alternatively, include one or more other types of magnets (e.g., sing-pole magnet(s)) in various embodiments. In some embodiments, each of the OIS-Y magnet 302 and the OIS-Y coil 304 may have a respective longest dimension that is parallel to the Y-axis. In some embodiments, the OIS-Y coil 304 may be oriented such that current flows through the coil in directions along a plane parallel to the X-Y plane.

In some embodiments, the AF VCM actuator may include a first magnet-coil pair and a second magnet-coil pair at opposite sides of the lens group 204, e.g., between a respective side of the lens group 204 and a respective lateral side of the base structure 208. Each magnet-coil pair may include, e.g., an AF magnet 220 attached to a side of the X stage 214, and a corresponding AF coil 222 coupled with a corresponding lateral side of the base structure 208. In some embodiments, at least a portion of the AF magnet 220 may be disposed within a recess defined by the X stage 214, e.g., as indicated in FIG. 2. In some embodiments, the AF magnet 220 may be a dual-pole magnet. However, the AF VCM actuator may additionally, or alternatively, include one or more other types of magnets (e.g., single-pole magnet(s)) in various embodiments. In some embodiments, each of the AF magnet 220 and the AF coil 222 may have a respective longest dimension that is parallel to the Z-axis. In some embodiments, the AF coil 222 may be oriented such that current flows through the coil in directions along a plane parallel to the X-Z plane.

In various embodiments, the camera 300 may include one or more ferritic components (e.g., formed of iron, stainless steel, etc.) that may be used to preload one or more of the stages against one or more sets of ball bearings of a bearing suspension arrangement (e.g., the bearing suspension arrangements described herein with reference to at least FIGS. 2 and 4A-4B). For example, a terrific component 306 may be positioned below the OIS-Y magnet 302 to preload the Y stage 210 and/or the Z stage 212 against one or more ball bearings of the bearing suspension arrangement (e.g., Z-tilt ball bearings 402 and/or Y-tilt ball bearings 404 in FIG. 4). In some embodiments, one or more ferritic components 308 may be positioned below the AF magnet(s) 220 to preload the X stage 214 against one or more ball bearings of the bearing suspension arrangement (e.g., the X-translation ball bearings 406 in FIG. 4).

FIGS. 4A-4B illustrate views of an example bearing suspension arrangement that may be included in a camera 400 with folded optics and a tilt actuator. FIG. 4A shows a perspective view of the bearing suspension arrangement. FIG. 4B shows a side cross-sectional view of the bearing suspension arrangement. In some embodiments, the bearing suspension arrangement and/or one or more other components of the camera 400 may be similar to, or the same as, the bearing suspension arrangement and/or one or more other components of the camera 200 in FIG. 2 and/or the camera 300 in FIG. 3.

In some embodiments, the bearing suspension arrangement may include the Y stage 210, the Z stage 212, and/or the X stage 214. In some embodiments, the prism 202 may be coupled with the Y stage 210 and the Z stage 212. Additionally, or alternatively, the lens group 204 may be coupled with the X stage 214.

Furthermore, the bearing suspension arrangement may include one or more ball bearings (e.g., made of steel, ceramic, etc.). In some embodiments, the bearing suspension arrangement may include one or more Z-tilt ball bearings 402, one or more Y-tilt ball bearings 404, and/or one or more X-translation ball bearings 406.

In some embodiments, the Z stage 212 may rest on (or otherwise be disposed above) a floor portion of the base structure 208, and may be configured to tilt (and/or rotate) about the Z-axis, e.g., via Z-tilt ball bearings 402 disposed between the Z stage and the floor portion of the base structure 208. According to some examples, the Z-axis tilt movement may be used to provide the OIS-Y movement previously mentioned with reference to FIG. 1. According to some embodiments, the Z-tilt ball bearings 402 may reside within a Z-tilt track 408 defined, e.g., by the Z stage 212 and/or the base structure 208. As indicated in FIG. 4B, for example, an underside of the Z stage 212 may be shaped so as to define one or more grooves, recesses, pockets, etc., that at least partially form the Z-tilt track 408. Additionally, or alternatively, a floor portion of the base structure 208 may be shaped so as to define one or more grooves, recesses, pockets, etc., that at least partially form the Z-tilt track 408. In some embodiments, the Z-tilt ball bearings 402 may be disposed in a space of the Z-tilt track 408 that may be sized to accommodate the Z-tilt ball bearings 402 between the underside of the Z stage 212 and the floor portion of the base structure 208. In various embodiments, the Z-tilt track 408 may be curved (e.g., forming a curve that follows a plane parallel to the X-Y plane) so that movement of the Z stage 212 on the Z-tilt ball bearings 402 along a path of motion allowed by the Z-tilt track 408 provides the Z-axis tilt movement of the Z-stage 212 (e.g., together with the Y stage 210 and the prism 202). In some embodiments, the Z-tilt track 408 may comprise multiple segments. For example, as indicated in FIG. 4A, the Z-tilt track 408 may comprise two segments that are opposite one another with respect to the prism 202. In other embodiments, however, the Z-tilt track 408 may comprise a single contiguous track.

In some embodiments, the Y stage 210 may rest on (or otherwise be disposed above) the Z stage 212, and may be configured to tilt (and/or rotate) about the Y-axis, e.g., via Y-tilt ball bearings 404 disposed between the Y stage 210 and the Z stage 212. According to some embodiments, the Y-axis tilt movement may be used to provide the OIS-Z movement previously mentioned with reference to FIG. 1. According to some embodiments, the Y-tilt ball bearings 404 may reside within a Y-tilt track 410 defined, e.g., by the Y stage 210 and/or the Z stage 212. As indicated in FIGS. 4A-4B, for example, an underside of the Y stage 210 may be shaped so as to define one or more grooves, recesses, pockets, etc., that at least partially form the Y-tilt track 410. Additionally, or alternatively, an upper portion of the Z stage 212 may be shaped so as to define one or more grooves, recesses, pockets, etc., that at least partially form the Y-tilt track 410. In some embodiments, the Y-tilt ball bearings 404 may be disposed in a space of the Y-tilt track 410 that may be sized to accommodate the Y-tilt ball bearings 404 between the underside of the Y stage 210 and the upper portion of the Z stage 212. In various embodiments, the Y-tilt track 410 may be curved (e.g., forming a curve that follows a plane parallel to the X-Z plane) so that movement of the Y stage 210 on the Y-tilt ball bearings 404 along a path of motion allowed by the Y-tilt track 410 provides the Y-axis tilt movement of the Y stage 210 (e.g., together with the prism 202). In some embodiments, the Y-tilt track 410 may comprise multiple segments. For example, as indicated in FIG. 4A, the Y-tilt track 410 may comprise two segments that are opposite one another with respect to the prism 202. In other embodiments, however, the Y-tilt track 410 may comprise a single contiguous track.

In some embodiments, the X stage 214 may rest on (or otherwise be disposed above) a floor portion of the base structure 208, and may be configured to translate along the X-axis, e.g., via X-translation ball bearings 406 disposed between the X stage 214 and the floor portion of the base structure 208. According to some embodiments, the X-axis translation movement may be used to provide the AF movement previously mentioned with reference to FIG. 1. In various embodiments, the lens group 204 may be coupled to the X stage 214, e.g., such that the lens group 204 moves together with the X stage 214. According to some embodiments, the X-translation ball bearing 406 may reside within an X-translation track 412 defined, e.g., by the X stage 214 and/or the base structure 208. As indicated in FIGS. 4A and 5B, for example, an underside of the X stage 214 may be shaped so as to define one or more grooves, recesses, pockets, etc., that at least partially form the X-translation track 412. Additionally, or alternatively, a floor portion of the base structure 208 may be shaped so as to define one or more grooves, recesses, pockets, etc., that at least partially form the X-translation track 412. In some embodiments, the X-translation ball bearings 406 may be disposed in a space of the X-translation track 412 that may be sized to accommodate the X-translation ball bearings 406 between the underside of the X stage 214 and the floor portion of the base structure 208. In various embodiments, the X-translation track 412 may be straight (e.g., parallel to the X-axis) so that movement of the X stage 214 on the X-translation ball bearings 4046 along a path of motion allowed by the X-translation track 412 provides the X-axis translation movement of the X stage 214 (e.g., together with the lens group 204). In some embodiments, the X-translation track 412 may comprise multiple segments. For example, as indicated in FIG. 4A, the X-translation track 412 may comprise two segments that are opposite one another with respect to the lens group 204. In other embodiments, however, the X-translation track 412 may comprise a single contiguous track.

FIGS. 5A-5B illustrate views of an example voice coil motor (VCM) actuator arrangement on a flex circuit 500 that may be included in a camera (e.g., as described herein with reference to FIGS. 1-4B and 6-9) with folded optics and a tilt actuator. FIG. 5A shows the flex circuit 500a in a flat state. FIG. 5B shows the flex circuit 500b in a folded state. In some instances, the flex circuit 500b may also be referred to herein as a folded flex circuit and/or a wrapped folded flex circuit.

In various embodiments, the VCM actuator arrangement and/or one or more other components may be mounted to, embedded (e.g., integrally formed), or otherwise arranged on the flex circuit 500. In some non-limiting examples, such components may include the OIS-Z coil(s) 216, the OIS-Y coil(s) 304, the AF coil(s) 222, the position sensor(s) 224, one or more driver integrated circuits 502 for driving the VCM actuator arrangement, e.g., as indicated in FIGS. 5A-5B.

In some embodiments, the flex circuit 500 may include one or more straight portions 504 and one or more bend portions 506. For example, the flex circuit 500 may include a first straight portion 504a, a second straight portion 504b, a third straight portion 504c, and/or a fourth straight portion 504d in some embodiments. Additionally, or alternatively, the flex circuit 500 may include a first bend portion 506a, a second bend portion 506b, and/or a third bend portion 506c, each of which may interconnect a respective pair of straight portions. For example, the first bend portion 506a may interconnect the first straight portion 504a with the second straight portion 504b. The second bend portion 506b may interconnect the first straight portion 504a with the third straight portion 504c. the third bend portion 506c may interconnect the first straight portion 504a with the fourth straight portion 504d. In various embodiments, the bend portions 506 may comprise location at which the flex circuit 500a may be folded (e.g., in directions indicated by bend arrows 508) to form the folded flex circuit 500b.

As indicated in FIG. 5B, the folded flex 500b may wrap around at least a portion of the base structure 208. The base structure 208 may define one or more cutouts 510 through which at least a portion of one or more respective coils of the VCM actuator arrangement may be disposed, e.g., so that the folded flex 500b may be attached to an exterior of the base structure 208 with the coils positioned proximate the magnets of the VCM actuator arrangement (which may be positioned within an interior at least partially encompassed by the base structure 208) to enable magnetic interaction between the magnets and the coils. In some embodiments, the base structure 208 may define a cutout 512 configured to allow light to reach an image sensor (e.g., the image sensor 206 in FIG. 2).

Figure 6:
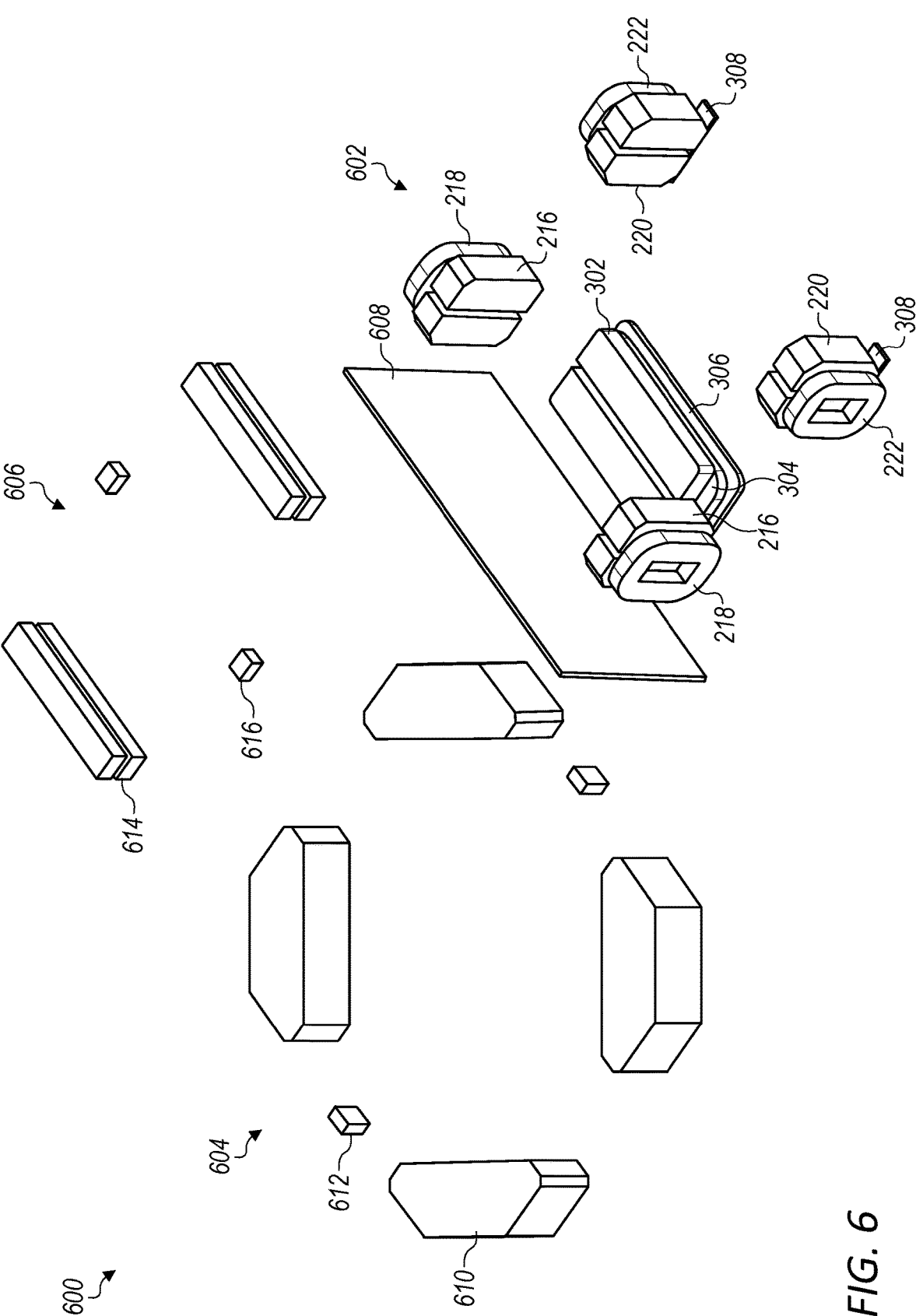
FIG. 6 illustrates an example system comprising a VCM actuator arrangement that may reduce magnetic interference with one or more other VCM actuators, in accordance with some embodiments.

FIG. 6 illustrates an example system 600 comprising a VCM actuator arrangement 602 that may reduce magnetic interference with one or more other VCM actuators. In various embodiments, the VCM actuator arrangement 602 may be included in a camera (e.g., as described herein with reference to FIGS. 1-5B and 7-9) with folded optics and a tilt actuator.

In some embodiments, the system 600 may include the VCM actuator arrangement 602 (also referred to as the "first VCM actuator arrangement 602"), a second VCM actuator arrangement 604, and/or a third VCM actuator arrangement 606. The first VCM actuator arrangement 602 may be located proximate the second VCM actuator arrangement 604 and/or the third VCM actuator arrangement 606, e.g., as indicated in FIG. 6.

According to various embodiments, the first VCM actuator arrangement 602 may arranged so as to reduce magnetic interaction between components of the first VCM actuator arrangement 602 and components of the second VCM actuator arrangement 604 and/or the third VCM actuator arrangement 606. In some embodiments, a camera that includes the first VCM actuator arrangement 606 may further include a shunt plate 608 configured to reduce magnetic interaction between the first VCM actuator arrangement and the second VCM actuator arrangement 604 and/or the third VCM actuator arrangement 606. In some embodiments, the shunt plate 608 may be attached to a shield can that at least partially covers the camera, e.g., as indicated in FIG. 9. In some examples, the shunt plate 608 may be disposed between the shield can and the base structure, and may extend along a plane that is parallel to the Y-Z plane.

In some non-limiting embodiments, the second VCM actuator arrangement 604 may include one or more corner magnets 610 and one or more position sensors 612, e.g., as indicated in FIG. 6. Additionally, or alternatively, the third VCM actuator arrangement 606 may include one or more side magnets 614 and one or more position sensors 616, e.g., as indicated in FIG. 6.

Figures 7A, 7B:
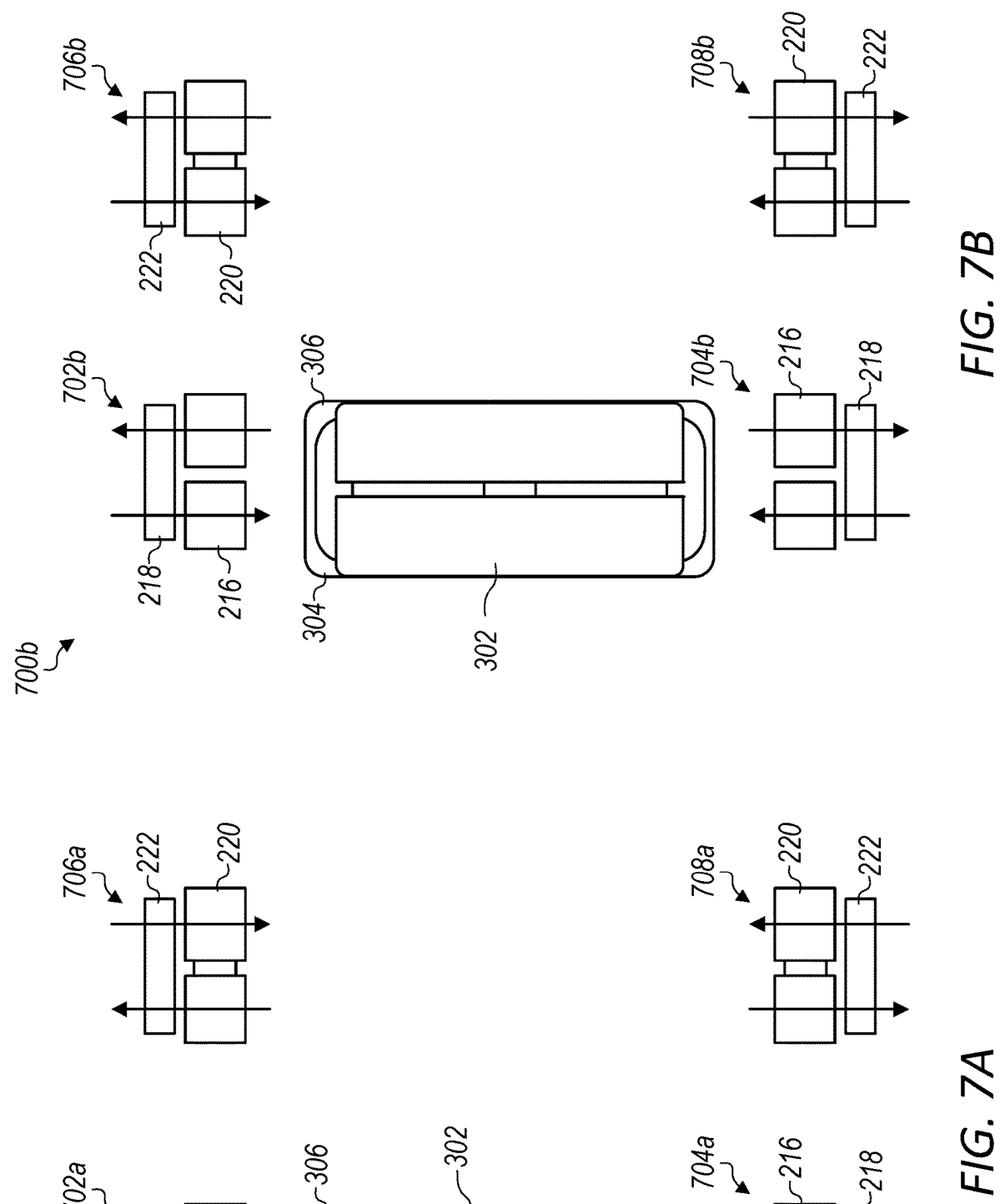
FIGS. 7A-7B illustrate respective top views of respective example VCM actuator magnet-coil arrangements that may be used in a camera with folded optics and a tilt actuator, in accordance with some embodiments.

FIGS. 7A-7B illustrate respective top views of respective example VCM actuator magnet-coil arrangements 700 that may be used in a camera with folded optics and a tilt actuator, in accordance with some embodiments. The arrows traversing the magnets indicate a polarization orientation (e.g., with the arrows pointing to respective North polarities).

In FIG. 7A, the VCM actuator magnet-coil arrangement 700a may include two OIS-Z magnet-coil pairs (e.g., each comprising an OIS-Z magnet 216 and a corresponding OIS-Z coil 218) that are opposite one another with respect to the OIS-Y magnet-coil pair (e.g., comprising an OIS-Y magnet 302 and an OIS-Y coil 304) and/or a prism (not shown). In some embodiments, the two OIS-Z magnet-coil pairs may include a first OIS-Z magnet-coil pair having a polarity orientation indicated by arrows 702a, and a second OIS-Z magnet-coil pair having a polarity orientation indicated by arrows 704a. The polarity orientation indicated by arrows 704a may be opposite (or "flipped" relative to) the polarity orientation indicated by arrows 702a.

Furthermore, the VC actuator magnet-coil arrangement 700a may include two AF magnet-coil pairs (e.g., each comprising an AF magnet 220 and a corresponding AF coil 222) that are opposite one another with respect to a lens group (not shown). In some embodiments, the two AF magnet-coil pairs may include a first AF magnet-coil pair having a polarity orientation indicated by arrows 706a (which may be the same as the polarity orientation indicated by arrows 702a), and a second AF magnet-coil pair having a polarity orientation indicated by arrows 708a (which may be the same as the polarity orientation indicated by arrows 704a). The polarity orientation indicated by arrows 704a may be opposite (or "flipped" relative to) the polarity orientation indicated by arrows 702a.

In FIG. 7B, the VCM actuator magnet-coil arrangement 700b my have polarity orientations that are flipped relative to those of the VCM actuator magnet-coil arrangement 700a in FIG. 7A in some embodiments. For example, the polarity orientations indicated by arrows 702b, 704b, 706b, and 708b may be opposite the polarity orientations indicated by 702a, 704a, 706a, and 708a, respectively.

FIGS. 8A-8D illustrate respective perspective views of some example structural components that may be included in a camera 800 with folded optics and a tilt actuator. According to various embodiments, the camera 800 may include a shield can 802, a moon roof cover 804, the cover plate 230, the stiffener 228, and the substrate 226 coupled with the image sensor 206, some or all of which may at least partially encompass the camera 800 and/or at least partially establish one or more sides of the camera 800, e.g., as indicated in FIGS. 8A-8D.

In some embodiments, the shield can 802 may at least partially cover and/or establish a top side of the camera 800 along a plane that is parallel to the X-Y plane. At the top side, the shield can 802 may define a cutout sized to accommodate the moon roof cover 804 above the lens group 204 and/or a cutout sized to accommodate the cover plate 230 above the prism 202. In some embodiments, one or more of such cutouts may be formed such that the prism 202 and the lens group 204 may be inserted into a VCM actuator module (e.g., manufactured and/or assembled at a different location than the prism 202 and/or the lens group 204) already within the shield can 802, e.g., so as to couple the prism 202 and/or the lens group 204 with the VCM actuator module. In some embodiments, the shield can 800 may comprise one or more recessed portions that at least partially surround one or more of the cutouts, e.g., so that the moon roof 804 and/or the top plate 230 may be attached to the shield can along the recessed portion(s), e.g., via an adhesive. The recessed portions(s) may allow a top surface of the moon roof 804 and/or a top surface of the top plate 230 to be flush with (or otherwise nearly flush with) a top surface of the shield can 802 in various embodiments, e.g., to reduce a Z-axis dimension of the camera 800.

Figure 8A:
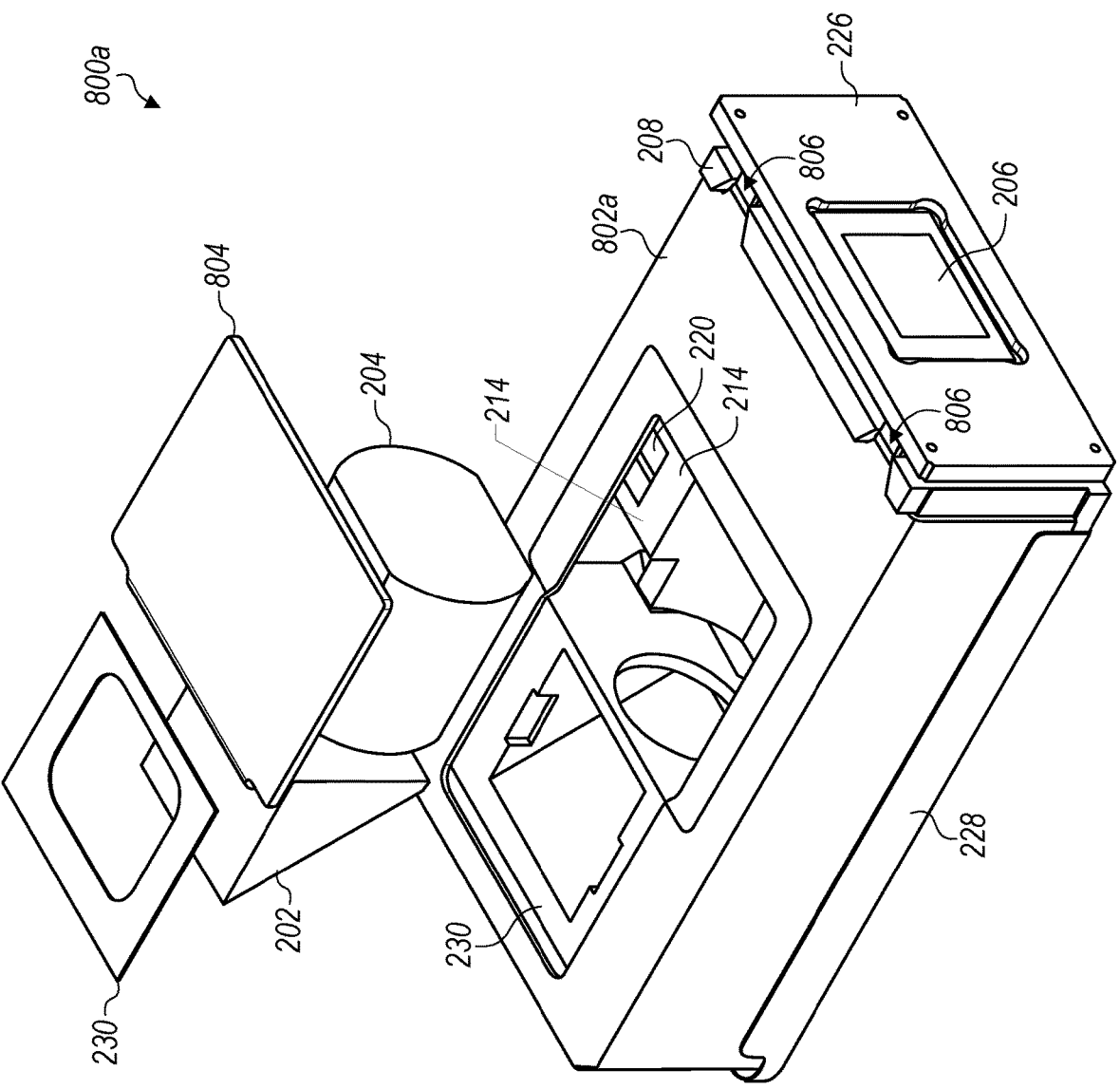
FIGS. 8A-8D illustrate respective perspective views of some example structural components that may be included in a camera with folded optics and a tilt actuator, in accordance with some embodiments.
Figure 8B:
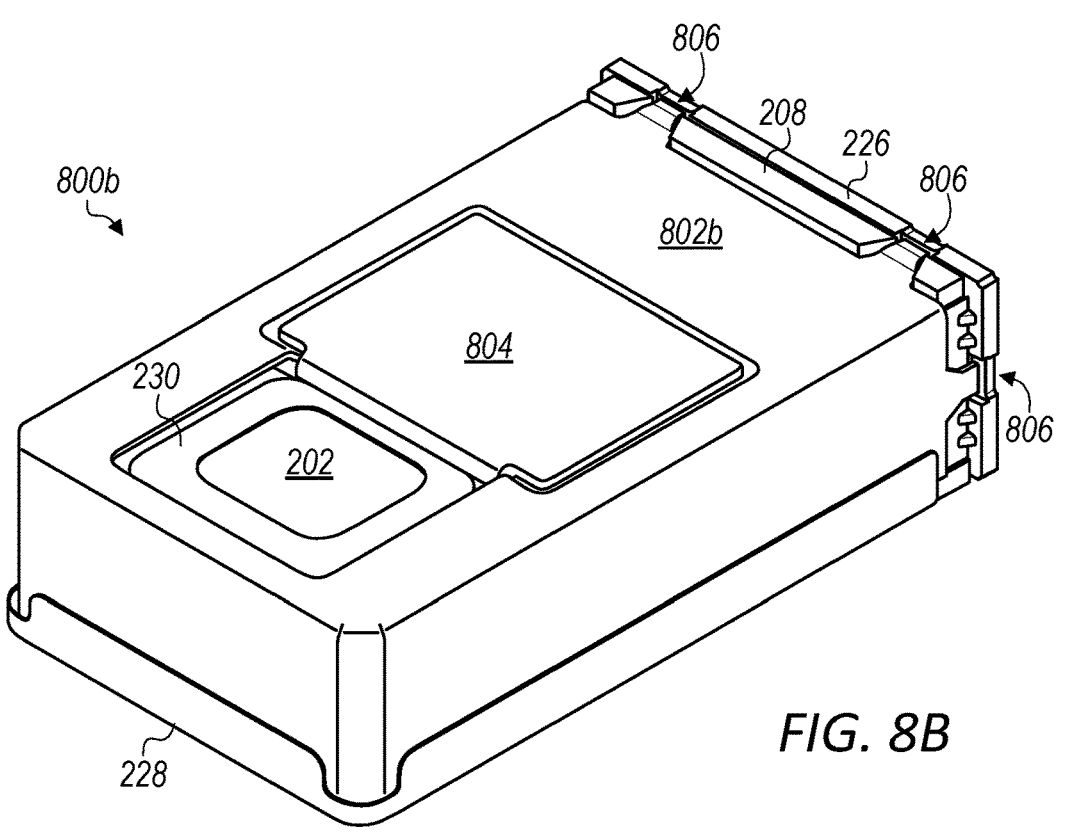
Figure 8C:
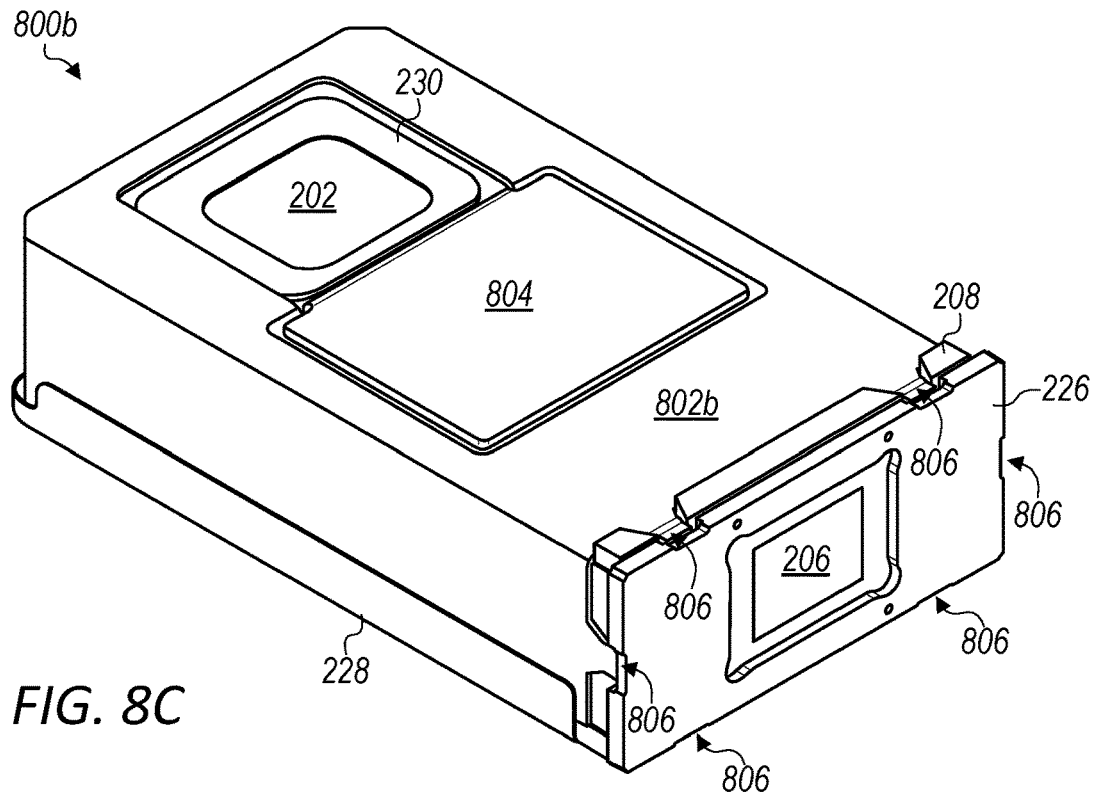
Figure 8D:
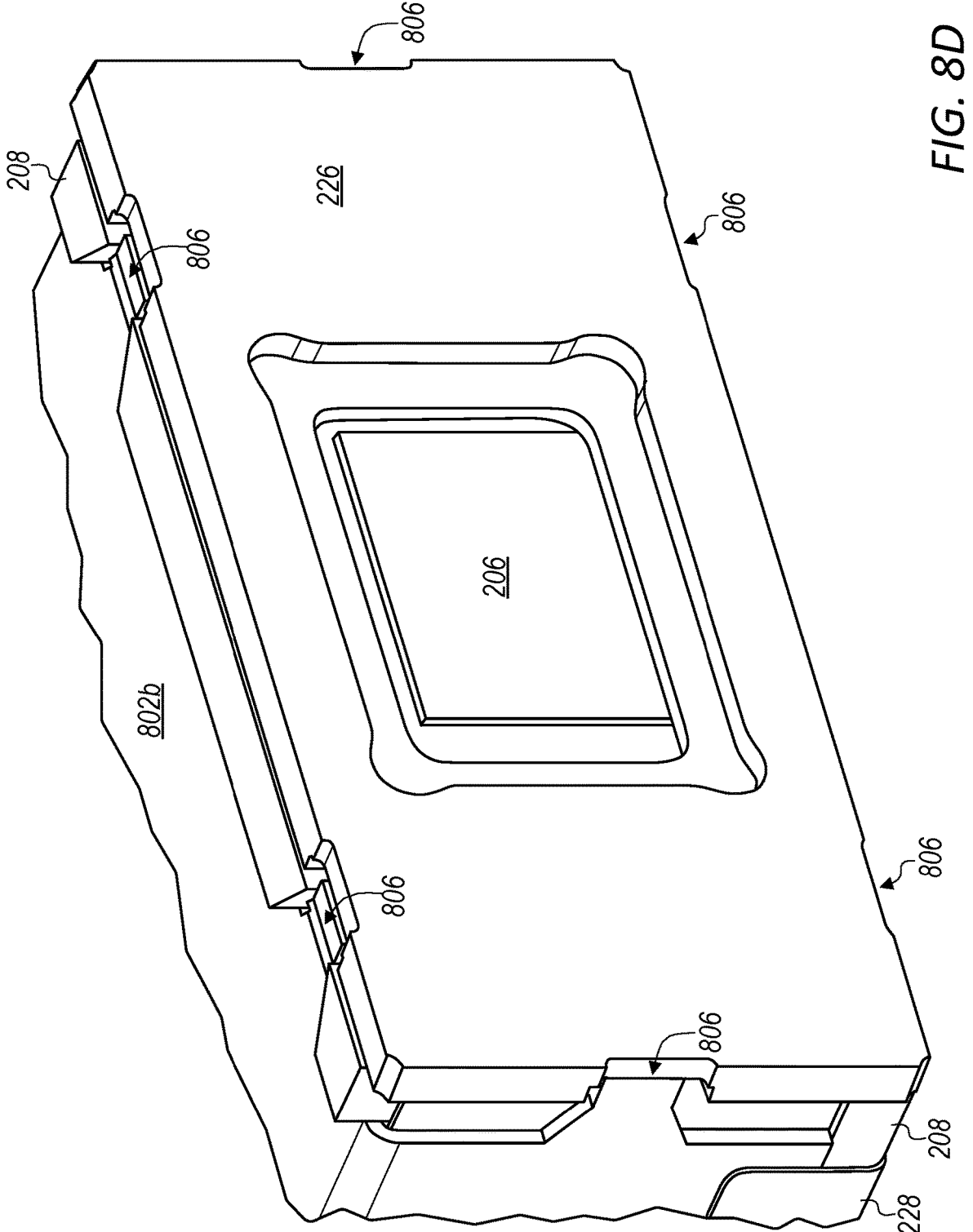

In some embodiments, the camera 800*a* in FIG. 8A may include a shield can 802*a* that is different (e.g., with respect to its attachment to the substrate 226) than a shield can 802*b* of the camera 800*b* in FIGS. 8B-8D. The camera 800*a* may include top and/or bottom anchors 806 that may mechanically attach the shield can 802*a* with the vertically-oriented substrate 226, e.g., as indicated in FIG. 8A. The camera 800*b* may include top, bottom, and/or side anchors 806 that may mechanically attach the shield can 802*b* with the vertically-oriented substrate 226, e.g., as indicated in FIGS. 8B-8D. The anchors 806 may comprise protrusions (e.g., tabs) of the shield can 802 configured to extend towards the substrate 226. In some embodiments, the base structure 208 may include a vertically-oriented frame portion (e.g., with the cutout 512 described herein with reference to FIG. 5B) that may include recesses through which the protrusions of the shield can 802 may extend. The substrate 226 may comprise pockets or one or more other structures that each correspond to a respective protrusion of the shield can 802. The protrusions may be configured to latch onto the pockets to mechanically secure the substrate 226 to the shield can 802. In some embodiments, the vertically-oriented frame portion of the base structure 208 may be sandwiched between the substrate 226 and at least a portion of the shield can 802, e.g., as indicated in FIG. 8D.

FIG. 9 illustrates a side cross-sectional view of an example camera 900 with folded optics and a tilt actuator. An example light path 902 passing through the folded optics of the camera 900 is indicated in FIG. 9. In some embodiments, the camera 900 may include a vertically-oriented filter 904 (e.g., an infrared filter) that may also be coupled to the substrate 226, e.g., such that the light path 902 passes through the filter 904 after passing through the lens group 204 and before reaching the image sensor 206.

As indicated in FIG. 9, the moon roof 804 may include a lip portion 906 that may partially extend downwards between the prism 202 (and/or the top plate 230) and the lens group 204. The lip portion 906 may be configured to reduce stray light that may reach the lens group 204 and/or the camera 900.

Multifunction Device Examples

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 10:
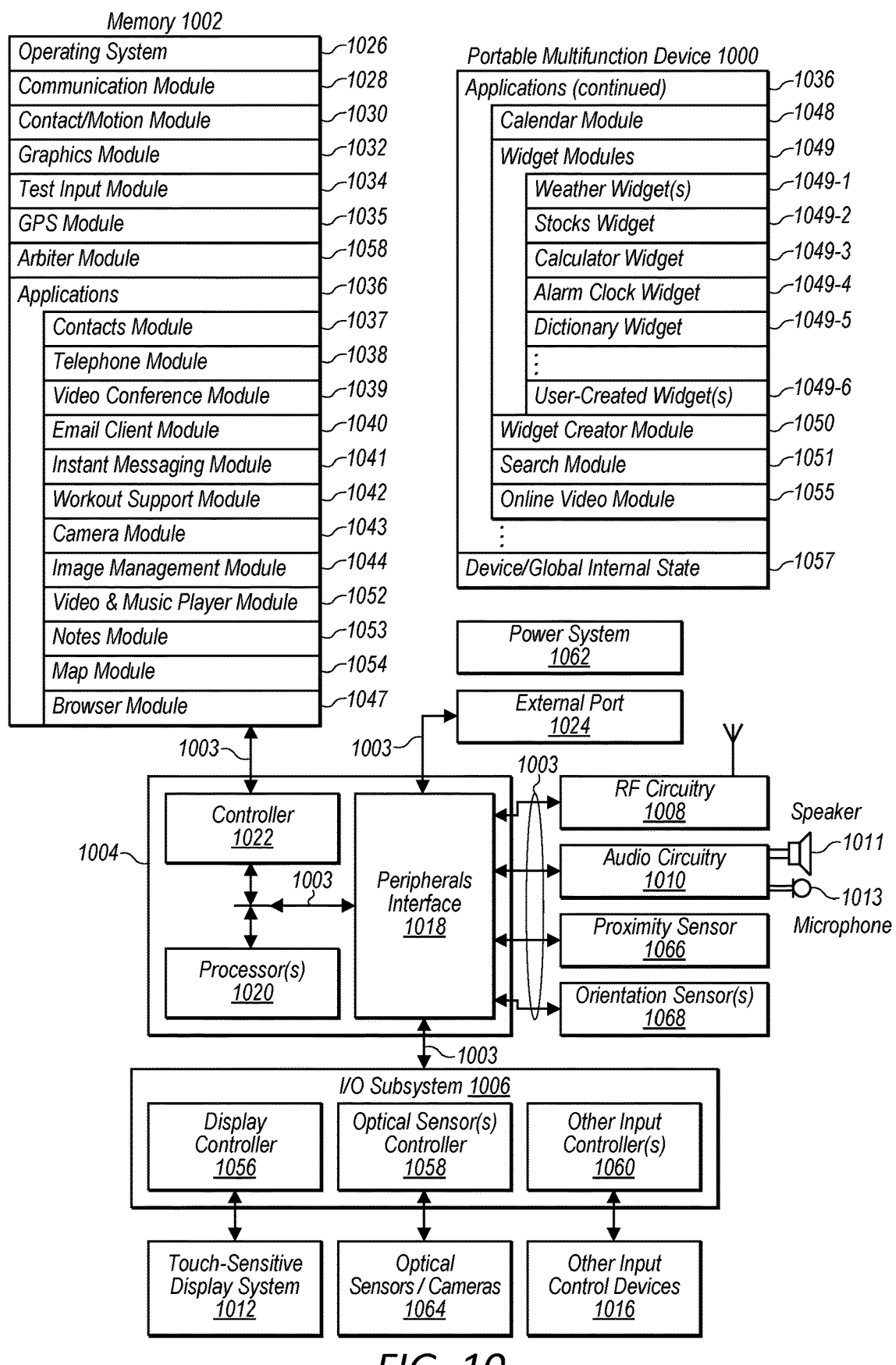
FIG. 10 illustrates a block diagram of an example portable multifunction device that may include a camera having folded optics and a tilt actuator, in accordance with some embodiments.

Attention is now directed toward embodiments of portable devices with cameras. FIG. 10 illustrates a block diagram of an example portable multifunction device 1000 that may include one or more cameras (e.g., the cameras described above with reference to FIGS. 1-9), in accordance with some embodiments. Cameras 1064 are sometimes called "optical sensors" for convenience, and may also be known as or called an optical sensor system. Device 1000 may include memory 1002 (which may include one or more computer readable storage mediums), memory controller 1022, one or more processing units (CPUs) 1020, peripherals interface 1018, RF circuitry 1008, audio circuitry 1010, speaker 1011, touch-sensitive display system 1012, microphone 1013, input/output (I/O) subsystem 1006, other input or control devices 1016, and external port 1024. Device 1000 may include multiple optical sensors 1064. These components may communicate over one or more communication buses or signal lines 1003.

It should be appreciated that device 1000 is only one example of a portable multifunction device, and that device 1000 may have more or fewer components than shown, may combine two or more components, or may have a different configuration or arrangement of the components. The various components shown in FIG. 10 may be implemented in hardware, software, or a combination of hardware and software, including one or more signal processing and/or application specific integrated circuits.

Memory 1002 may include high-speed random access memory and may also include non-volatile memory, such as one or more magnetic disk storage devices, flash memory devices, or other non-volatile solid-state memory devices. Access to memory 1002 by other components of device 1000, such as CPU 1020 and the peripherals interface 1018, may be controlled by memory controller 1022.

Peripherals interface 1018 can be used to couple input and output peripherals of the device to CPU 1020 and memory 1002. The one or more processors 1020 run or execute various software programs and/or sets of instructions stored in memory 1002 to perform various functions for device 1000 and to process data.

In some embodiments, peripherals interface 1018, CPU 1020, and memory controller 1022 may be implemented on a single chip, such as chip 1004. In some other embodiments, they may be implemented on separate chips.

RF (radio frequency) circuitry 1008 receives and sends RF signals, also called electromagnetic signals. RF circuitry 1008 converts electrical signals to/from electromagnetic signals and communicates with communications networks and other communications devices via the electromagnetic signals. RF circuitry 1008 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1008 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1010, speaker 1011, and microphone 1013 provide an audio interface between a user and device 1000. Audio circuitry 1010 receives audio data from peripherals interface 1018, converts the audio data to an electrical signal, and transmits the electrical signal to speaker 1011. Speaker 1011 converts the electrical signal to human-audible sound waves. Audio circuitry 1010 also receives electrical signals converted by microphone 1013 from sound waves. Audio circuitry 1010 converts the electrical signal to audio data and transmits the audio data to peripherals interface 1018 for processing. Audio data may be retrieved from and/or transmitted to memory 1002 and/or RF circuitry 1008 by peripherals interface 1018. In some embodiments, audio circuitry 1010 also includes a headset jack (e.g., 1112, FIG.

11). The headset jack provides an interface between audio circuitry 1010 and removable audio input/output peripherals, such as output-only headphones or a headset with both output (e.g., a headphone for one or both ears) and input (e.g., a microphone).

I/O subsystem 1006 couples input/output peripherals on device 1000, such as touch screen 1012 and other input control devices 1016, to peripherals interface 1018. I/O subsystem 1006 may include display controller 1056 and one or more input controllers 1060 for other input or control devices. The one or more input controllers 1060 receive/send electrical signals from/to other input or control devices 1016. The other input control devices 1016 may include physical buttons (e.g., push buttons, rocker buttons, etc.), dials, slider switches, joysticks, click wheels, and so forth. In some alternate embodiments, input controller(s) 1060 may be coupled to any (or none) of the following: a keyboard, infrared port, USB port, and a pointer device such as a mouse. The one or more buttons (e.g., 1108, FIG. 11) may include an up/down button for volume control of speaker 1011 and/or microphone 1013. The one or more buttons may include a push button (e.g., 1106, FIG. 11).

Touch-sensitive display 1012 provides an input interface and an output interface between the device and a user. Display controller 1056 receives and/or sends electrical signals from/to touch screen 1012. Touch screen 1012 displays visual output to the user. The visual output may include graphics, text, icons, video, and any combination thereof (collectively termed "graphics"). In some embodiments, some or all of the visual output may correspond to user-interface objects.

Touch screen 1012 has a touch-sensitive surface, sensor or set of sensors that accepts input from the user based on haptic and/or tactile contact. Touch screen 1012 and display controller 1056 (along with any associated modules and/or sets of instructions in memory 1002) detect contact (and any movement or breaking of the contact) on touch screen 1012 and converts the detected contact into interaction with user-interface objects (e.g., one or more soft keys, icons, web pages or images) that are displayed on touch screen 1012. In an example embodiment, a point of contact between touch screen 1012 and the user corresponds to a finger of the user.

Touch screen 1012 may use LCD (liquid crystal display) technology, LPD (light emitting polymer display) technology, or LED (light emitting diode) technology, although other display technologies may be used in other embodiments. Touch screen 1012 and display controller 1056 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1012. In an example embodiment, projected mutual capacitance sensing technology is used, such as that found in the iPhone®, iPod Touch®, and iPad® from Apple Inc. of Cupertino, California.

Touch screen 1012 may have a video resolution in excess of 800 dpi. In some embodiments, the touch screen has a video resolution of approximately 860 dpi. The user may make contact with touch screen 1012 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1000 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1012 or an extension of the touch-sensitive surface formed by the touch screen.

Device 1000 also includes power system 1062 for powering the various components. Power system 1062 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1000 may also include one or more optical sensors or cameras 1064. FIG. shows an optical sensor 1064 coupled to optical sensor controller 1058 in I/O subsystem 1006. Optical sensor 1064 may include charge-coupled device (CCD) or complementary metal-oxide semiconductor (CMOS) phototransistors. Optical sensor 1064 receives light from the environment, projected through one or more lens, and converts the light to data representing an image. In conjunction with imaging module 1043 (also called a camera module), optical sensor 1064 may capture still images or video. In some embodiments, an optical sensor 1064 is located on the back of device 1000, opposite touch screen display 1012 on the front of the device, so that the touch screen display 1012 may be used as a viewfinder for still and/or video image acquisition. In some embodiments, another optical sensor is located on the front of the device so that the user's image may be obtained for videoconferencing while the user views the other video conference participants on the touch screen display.

Device 1000 may also include one or more proximity sensors 1066. FIG. 10 shows proximity sensor 1066 coupled to peripherals interface 1018. Alternately, proximity sensor 1066 may be coupled to input controller 1060 in I/O subsystem 1006. In some embodiments, the proximity sensor 1066 turns off and disables touch screen 1012 when the multifunction device 1000 is placed near the user's ear (e.g., when the user is making a phone call).

Device 1000 includes one or more orientation sensors 1068. In some embodiments, the one or more orientation sensors 1068 include one or more accelerometers (e.g., one or more linear accelerometers and/or one or more rotational accelerometers). In some embodiments, the one or more orientation sensors 1068 include one or more gyroscopes. In some embodiments, the one or more orientation sensors 1068 include one or more magnetometers. In some embodiments, the one or more orientation sensors 1068 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1000. In some embodiments, the one or more orientation sensors 1068 include any combination of orientation/rotation sensors. FIG. 10 shows the one or more orientation sensors 1068 coupled to peripherals interface 1018. Alternately, the one or more orientation sensors 1068 may be coupled to an input controller 1060 in I/O subsystem 1006. In some embodiments, information is displayed on the touch screen display 1012 in a portrait view or a landscape view based on an analysis of data received from the one or more orientation sensors 1068.

In some embodiments, the software components stored in memory 1002 include operating system 1026, communication module (or set of instructions) 1028, contact/motion module (or set of instructions) 1030, graphics module (or set of instructions) 1032, text input module (or set of instructions) 1034, Global Positioning System (GPS) module (or set of instructions) 1035, arbiter module 1058 and applications (or sets of instructions) 1036. Furthermore, in some embodiments memory 1002 stores device/global internal state 1057. Device/global internal state 1057 includes one or more of: active application state, indicating which applications, if any, are currently active; display state, indicating what applications, views or other information occupy various regions of touch screen display 1012; sensor state, including information obtained from the device's various sensors and input control devices 1016; and location information concerning the device's location and/or attitude.

Operating system 1026 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1028 facilitates communication with other devices over one or more external ports 1024 and also includes various software components for handling data received by RF circuitry 1008 and/or external port 1024. External port 1024 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 1030 may detect contact with touch screen 1012 (in conjunction with display controller 1056) and other touch sensitive devices (e.g., a touchpad or physical click wheel). Contact/motion module 1030 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1030 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1030 and display controller 1056 detect contact on a touchpad.

Contact/motion module 1030 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off)

event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1032 includes various known software components for rendering and displaying graphics on touch screen 1012 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1032 stores data representing graphics to be used. Each graphic may be assigned a corresponding code. Graphics module 1032 receives, from applications etc., one or more codes specifying graphics to be displayed along with, if necessary, coordinate data and other graphic property data, and then generates screen image data to output to display controller 1056.

Text input module 1034, which may be a component of graphics module 1032, provides soft keyboards for entering text in various applications (e.g., contacts 10310, e-mail 1040, IM 1041, browser 1047, and any other application that needs text input).

GPS module 1035 determines the location of the device and provides this information for use in various applications (e.g., to telephone 1038 for use in location-based dialing, to camera 1043 as picture/video metadata, and to applications that provide location-based services such as weather widgets, local yellow page widgets, and map/navigation widgets).

Applications 1036 may include the following modules (or sets of instructions), or a subset or superset thereof:

contacts module 1037 (sometimes called an address book or contact list);
telephone module 1038;
video conferencing module 1039;
e-mail client module 1040;
instant messaging (IM) module 1041;
workout support module 1042;
camera module 1043 for still and/or video images;
image management module 1044;
browser module 1047;
calendar module 1048;
widget modules 1049, which may include one or more of: weather widget 1049-1, stocks widget 1049-2, calculator widget 1049-3, alarm clock widget 1049-4, dictionary widget 1049-5, and other widgets obtained by the user, as well as user-created widgets 1049-6;
widget creator module 1050 for making user-created widgets 1049-6;
search module 1051;
video and music player module 1052, which may be made up of a video player module and a music player module;
notes module 1053;
map module 1054; and/or
online video module 1055.

Examples of other applications 1036 that may be stored in memory 1002 include other word processing applications, other image editing applications, drawing applications, presentation applications, JAVA-enabled applications, encryption, digital rights management, voice recognition, and voice replication.

In conjunction with touch screen 1012, display controller 1056, contact module 1030, graphics module 1032, and text input module 1034, contacts module 1037 may be used to manage an address book or contact list (e.g., stored in application internal state 1057), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1038, video conference 1039, e-mail 1040, or IM 1041; and so forth.

In conjunction with RF circuitry 1008, audio circuitry 1010, speaker 1011, microphone 1013, touch screen 1012, display controller 1056, contact module 1030, graphics module 1032, and text input module 1034, telephone module 1038 may be used to enter a sequence of characters corresponding to a telephone number, access one or more telephone numbers in address book 1037, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1008, audio circuitry 1010, speaker 1011, microphone 1013, touch screen 1012, display controller 1056, optical sensor 1064, optical sensor controller 1058, contact module 1030, graphics module 1032, text input module 1034, contact list 1037, and telephone module 1038, videoconferencing module 1039 includes executable instructions to initiate, conduct, and terminate a video conference between a user and one or more other participants in accordance with user instructions.

In conjunction with RF circuitry 1008, touch screen 1012, display controller 1056, contact module 1030, graphics module 1032, and text input module 1034, e-mail client module 1040 includes executable instructions to create, send, receive, and manage e-mail in response to user instructions. In conjunction with image management module 1044, e-mail client module 1040 makes it very easy to create and send e-mails with still or video images taken with camera module 1043.

In conjunction with RF circuitry 1008, touch screen 1012, display controller 1056, contact module 1030, graphics module 1032, and text input module 1034, the instant messaging module 1041 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1008, touch screen 1012, display controller 1056, contact module 1030, graphics module 1032, text input module 1034, GPS module 1035, map module 1054, and music player module 1046, workout support module 1042 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1012, display controller 1056, optical sensor(s) 1064, optical sensor controller 1058, contact module 1030, graphics module 1032, and image management module 1044, camera module 1043 includes executable instructions to capture still images or video (including a video stream) and store them into memory 1002, modify characteristics of a still image or video, or delete a still image or video from memory 1002.

In conjunction with touch screen 1012, display controller 1056, contact module 1030, graphics module 1032, text input module 1034, and camera module 1043, image management module 1044 includes executable instructions to arrange, modify (e.g., edit), or otherwise manipulate, label, delete, present (e.g., in a digital slide show or album), and store still and/or video images.

In conjunction with RF circuitry 1008, touch screen 1012, display system controller 1056, contact module 1030, graphics module 1032, and text input module 1034, browser module 1047 includes executable instructions to browse the Internet in accordance with user instructions, including searching, linking to, receiving, and displaying web pages or portions thereof, as well as attachments and other files linked to web pages.

In conjunction with RF circuitry 1008, touch screen 1012, display system controller 1056, contact module 1030, graphics module 1032, text input module 1034, e-mail client module 1040, and browser module 1047, calendar module 1048 includes executable instructions to create, display, modify, and store calendars and data associated with calendars (e.g., calendar entries, to do lists, etc.) in accordance with user instructions.

In conjunction with RF circuitry 1008, touch screen 1012, display system controller 1056, contact module 1030, graphics module 1032, text input module 1034, and browser module 1047, widget modules 1049 are mini-applications that may be downloaded and used by a user (e.g., weather widget 549-1, stocks widget 549-2, calculator widget 1049-3, alarm clock widget 1049-4, and dictionary widget 1049-5) or created by the user (e.g., user-created widget 1049-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1008, touch screen 1012, display system controller 1056, contact module 1030, graphics module 1032, text input module 1034, and browser module 1047, the widget creator module 1050 may be used by a user to create widgets (e.g., turning a user-specified portion of a web page into a widget).

In conjunction with touch screen 1012, display system controller 1056, contact module 1030, graphics module 1032, and text input module 1034, search module 1051 includes executable instructions to search for text, music, sound, image, video, and/or other files in memory 1002 that match one or more search criteria (e.g., one or more user-specified search terms) in accordance with user instructions.

In conjunction with touch screen 1012, display system controller 1056, contact module 1030, graphics module 1032, audio circuitry 1010, speaker 1011, RF circuitry 1008, and browser module 1047, video and music player module 1052 includes executable instructions that allow the user to download and play back recorded music and other sound files stored in one or more file formats, such as MP3 or AAC files, and executable instructions to display, present or otherwise play back videos (e.g., on touch screen 1012 or on an external, connected display via external port 1024). In some embodiments, device 1000 may include the functionality of an MP3 player.

In conjunction with touch screen 1012, display controller 1056, contact module 1030, graphics module 1032, and text input module 1034, notes module 1053 includes executable instructions to create and manage notes, to do lists, and the like in accordance with user instructions.

In conjunction with RF circuitry 1008, touch screen 1012, display system controller 1056, contact module 1030, graphics module 1032, text input module 1034, GPS module 1035, and browser module 1047, map module 1054 may be used to receive, display, modify, and store maps and data associated with maps (e.g., driving directions; data on stores and other points of interest at or near a particular location; and other location-based data) in accordance with user instructions.

In conjunction with touch screen 1012, display system controller 1056, contact module 1030, graphics module 1032, audio circuitry 1010, speaker 1011, RF circuitry 1008, text input module 1034, e-mail client module 1040, and browser module 1047, online video module 1055 includes instructions that allow the user to access, browse, receive (e.g., by streaming and/or download), play back (e.g., on the touch screen or on an external, connected display via external port 1024), send an e-mail with a link to a particular online video, and otherwise manage online videos in one or more file formats, such as H.264. In some embodiments, instant messaging module 1041, rather than e-mail client module 1040, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 1002 may store a subset of the modules and data structures identified above. Furthermore, memory 1002 may store additional modules and data structures not described above.

In some embodiments, device 1000 is a device where operation of a predefined set of functions on the device is performed exclusively through a touch screen and/or a touchpad. By using a touch screen and/or a touchpad as the primary input control device for operation of device 1000, the number of physical input control devices (such as push buttons, dials, and the like) on device 1000 may be reduced.

The predefined set of functions that may be performed exclusively through a touch screen and/or a touchpad include navigation between user interfaces. In some embodiments, the touchpad, when touched by the user, navigates device 1000 to a main, home, or root menu from any user interface that may be displayed on device 1000. In such embodiments, the touchpad may be referred to as a "menu button." In some other embodiments, the menu button may be a physical push button or other physical input control device instead of a touchpad.

Figure 11:
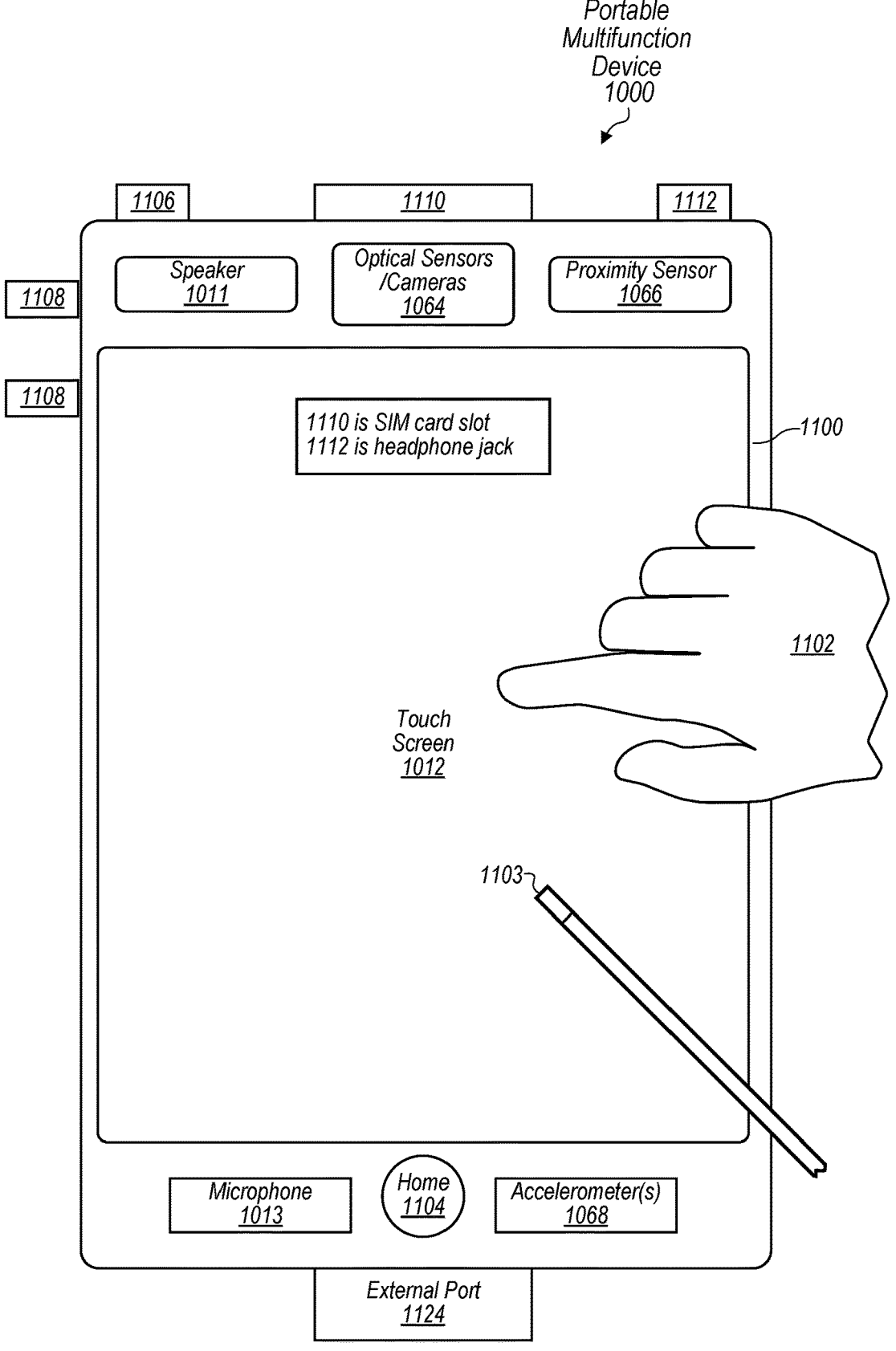
FIG. 11 depicts an example portable multifunction device that may include a camera having folded optics and a tilt actuator, in accordance with some embodiments.

FIG. 11 depicts illustrates an example portable multifunction device 1000 that may include one or more cameras (e.g., the cameras described above with reference to FIGS. 1-9), in accordance with some embodiments. The device 1000 may have a touch screen 1012. The touch screen 1012 may display one or more graphics within user interface (UI) 1100. In this embodiment, as well as others described below, a user may select one or more of the graphics by making a gesture on the graphics, for example, with one or more fingers 1102 (not drawn to scale in the figure) or one or more styluses 1103 (not drawn to scale in the figure).

Device 1000 may also include one or more physical buttons, such as "home" or menu button 1104. As described previously, menu button 1104 may be used to navigate to any application 1036 in a set of applications that may be executed on device 1000. Alternatively, in some embodiments, the menu button 1104 is implemented as a soft key in a GUI displayed on touch screen 1012.

In one embodiment, device 1000 includes touch screen 1012, menu button 1104, push button 1106 for powering the device on/off and locking the device, volume adjustment button(s) 1108, Subscriber Identity Module (SIM) card slot 1110, head set jack 1112, and docking/charging external port 1124. Push button 1106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1000 also may accept verbal input for activation or deactivation of some functions through microphone 1013.

It should be noted that, although many of the examples herein are given with reference to optical sensor(s)/camera(s) 1064 (on the front of a device), one or more rear-facing cameras or optical sensors that are pointed opposite from the display may be used instead of, or in addition to, an optical sensor(s)/camera(s) 1064 on the front of a device.

Example Computer System

Figure 12:
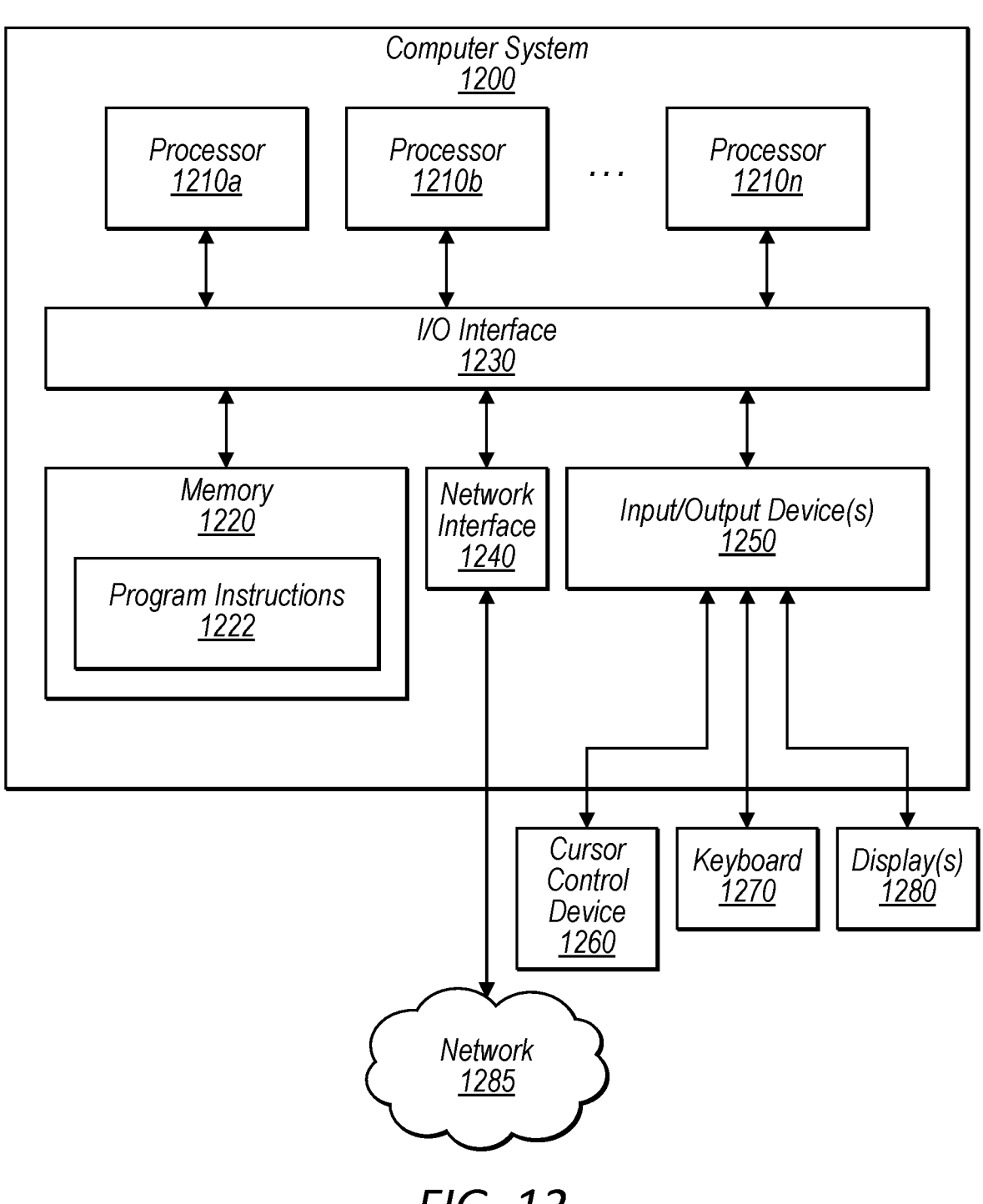
FIG. 12 illustrates an example computer system that may include a camera having folded optics and a tilt actuator, in accordance with some embodiments.

FIG. 12 illustrates an example computer system 1200 that may include one or more cameras (e.g., the cameras described above with reference to FIGS. 1-9), according to some embodiments. The computer system 1200 may be configured to execute any or all of the embodiments described above. In different embodiments, computer system 1200 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 1200, which may interact with various other devices. Note that any component, action, or functionality described above with respect to FIGS. 1-11 may be implemented on one or more computers configured as computer system 1200 of FIG. 12, according to various embodiments. In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some cases, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store camera control program instructions 1222 and/or camera control data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions 1222 may be configured to implement a lens control application 1224 incorporating any of the functionality described above. Additionally, existing camera control data 1232 of memory 1220 may include any of the information or data structures described above. In some embodiments, program instructions and/or data may be received, sent or stored upon different types of computer-accessible media or on similar media separate from system memory 1220 or computer system 1200. While computer system 1200 is described as implementing the functionality of functional blocks of previous Figures, any of the functionality described herein may be implemented via such a computer system.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network 1285 (e.g., carrier or agent devices) or between nodes of computer system 1200. Network 1285 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or accessing data by one or more computer systems 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1222, which may be processor-executable to implement any element or action described above. In one embodiment, the program instructions may implement the methods described above. In other embodiments, different elements and data may be included. Note that data may include any data or information described above.

Those skilled in the art will appreciate that computer system 1200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations.

Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:

a folded optics arrangement to fold a path of light, the folded optics arrangement comprising a prism;

an image sensor to capture light that has passed through the prism;

an actuator arrangement to tilt the prism about a plurality of axes to provide optical image stabilization (OIS) motion of an image on the image sensor; and a bearing suspension arrangement comprising stages configured to move on ball bearings, such that the stages suspend the prism from a base structure and allow motion of the prism enabled by the actuator arrangement, wherein the stages comprise:

a lower stage configured to tilt about a first axis using a first set of ball bearings between the lower stage and the base structure and beneath the lower stage in a direction parallel to the first axis; and an upper stage above the lower stage and configured to tilt about the first axis and a second axis that is orthogonal to the first axis, wherein the upper stage includes a first magnet for the actuator arrangement configured to tilt the upper stage and the lower stage about the first axis and a second magnet for the actuator arrangement configured to tilt the upper stage about the second axis; and a flex circuit, comprising:

a plurality of bend portions at which the flex circuit is folded to wrap around at least a portion of the base structure; and a plurality of straight portions, comprising:

a first straight portion comprising a first inner surface located beside the upper stage to provide a first coil for the actuator arrangement to interact with the first magnet to tilt the upper stage and the lower stage about the first axis; and a second straight portion comprising a second inner surface located beneath the lower stage to provide a second coil for the actuator arrangement to interact with the second magnet to tilt the upper stage about the second axis.

2. The camera of claim 1, wherein the folded optics arrangement further comprises a lens group comprising one or more lens elements, and wherein the actuator arrangement is further configured to: translate the lens group along an axis to provide autofocus (AF) motion of the image on the image sensor, wherein the axis is orthogonal to the plurality of axes about which actuator arrangement tilts the prism.

3. The camera of claim 2, wherein the bearing suspension arrangement further comprises: a stage configured to move on ball bearings, wherein the stage suspends the lens group from the base structure and allows motion of the lens group enabled by the actuator arrangement.

4. The camera of claim 1, wherein the ball bearings comprise:

the first set of ball bearings used for tilting the lower stage, together with the upper stage, about the first axis; and a second set of ball bearings used for tilting the upper stage, relative to the lower stage, about the second axis.

5. The camera of claim 1, further comprising:

a shield can that at least partially encases a top side of the camera, wherein, at the top side, the shield can defines a cutout; and a cover, wherein the cutout is sized to accommodate the cover above a lens group, and wherein the cover comprises a lip that partially extends downward between the prism and the lens group.

6. The camera of claim 1, wherein an underside of the upper stage at least partially defines a track for a set of ball bearings disposed between the underside of the upper stage and an upper portion of the lower stage.

7. The camera of claim 1, wherein the upper stage is configured to tilt about the second axis using a second set of ball bearings between the upper stage and the lower stage.

8. The camera of claim 7, further comprising a preload plate located beneath the lower stage and configured to magnetically interact with the second magnet to secure both the first set of ball bearings in one or more first tracks and the second set of ball bearings in one or more second tracks.

9. A device, comprising:

one or more processors;

memory storing program instructions executable by the one or more processors to control operations of a camera;

the camera, comprising:

a folded optics arrangement to fold a path of light, the folded optics arrangement comprising a prism;

an image sensor to capture light that has passed through the prism;

an actuator arrangement to tilt the prism about a plurality of axes to provide optical image stabilization (OIS) motion of an image on the image sensor; and a bearing suspension arrangement comprising stages configured to move on ball bearings, such that the stages suspend the prism from a base structure and allow motion of the prism enabled by the actuator arrangement, wherein the stages comprise:

a lower stage configured to tilt about a first axis using a first set of ball bearings between the lower stage and the base structure and beneath the lower stage in a direction parallel to the first axis; and an upper stage above the lower stage and configured to tilt about the first axis and a second axis that is orthogonal to the first axis, wherein the upper stage includes a first magnet for the actuator arrangement configured to tilt the upper stage and the lower stage about the first axis and a second magnet for the actuator arrangement configured to tilt the upper stage about the second axis; and a flex circuit, comprising:

a plurality of bend portions at which the flex circuit is folded to wrap around at least a portion of the base structure; and a plurality of straight portions, comprising:

a first straight portion comprising a first inner surface located beside the upper stage to provide a first coil for the actuator arrangement to interact with the first magnet to tilt the upper stage and the lower stage about the first axis; and a second straight portion comprising a second inner surface located beneath the lower stage to provide a second coil for the actuator arrangement to interact with the second magnet to tilt the upper stage about the second axis.

10. The device of claim 9, wherein the folded optics arrangement further comprises a lens group comprising one or more lens elements, and wherein the actuator arrangement is further configured to: translate the lens group along an axis to provide autofocus (AF) motion of the image on the image sensor, wherein the axis is orthogonal to the plurality of axes about which actuator arrangement tilts the prism.

11. The device of claim 10, wherein the bearing suspension arrangement further comprises: a stage configured to move on ball bearings, wherein the stage suspends the lens group from the base structure and allows motion of the lens group enabled by the actuator arrangement.

12. The device of claim 9, wherein the ball bearings comprise:

the first set of ball bearings used for tilting the lower stage, together with the upper stage, about the first axis; and a second set of ball bearings used for tilting the upper stage, relative to the lower stage, about the second axis.

13. The device of claim 12, wherein:

the lower stage is configured to rest on the first set of ball bearings; and the upper stage is configured to rest on the second set of ball bearings.

14. The device of claim 9, wherein the camera further comprises:

a shield can that at least partially encases a top side of the camera, wherein, at the top side, the shield can defines a cutout; and a cover, wherein the cutout is sized to accommodate the cover above a lens group, and wherein the cover comprises a lip that partially extends downward between the prism and the lens group.

15. The device of claim 9, wherein an underside of the upper stage at least partially defines a track for a set of ball bearings disposed between the underside of the upper stage and an upper portion of the lower stage.

16. The device of claim 9, wherein the upper stage is configured to tilt about the second axis using a second set of ball bearings between the upper stage and the lower stage.

17. The device of claim 16, further comprising a preload plate located beneath the lower stage and configured to magnetically interact with the second magnet to secure both the first set of ball bearings in one or more first tracks and the second set of ball bearings in one or more second tracks.

18. An optics system, comprising:

a folded optics arrangement to fold a path of light, the folded optics arrangement comprising a prism;

an actuator arrangement to tilt the prism about a plurality of axes to provide optical image stabilization (OIS) motion of an image on an image sensor; and a bearing suspension arrangement comprising stages configured to move on ball bearings, such that the stages suspend the prism from a base structure and allow motion of the prism enabled by the actuator arrangement, wherein the stages comprise:

a lower stage configured to tilt about a first axis using a first set of ball bearings between the lower stage and the base structure and beneath the lower stage in a direction parallel to the first axis; and an upper stage above the lower stage and configured to tilt about the first axis and a second axis that is orthogonal to the first axis, wherein the upper stage includes a first magnet for the actuator arrangement configured to tilt the upper stage and the lower stage about the first axis and a second magnet for the actuator arrangement configured to tilt the upper stage about the second axis; and a flex circuit, comprising:

a plurality of bend portions at which the flex circuit is folded to wrap around at least a portion of the base structure; and a plurality of straight portions, comprising:

a first straight portion comprising a first inner surface located beside the upper stage to provide a first coil for the actuator arrangement to interact with the first magnet to tilt the upper stage and the lower stage about the first axis; and a second straight portion comprising a second inner surface located beneath the lower stage to provide a second coil for the actuator arrangement to interact with the second magnet to tilt the upper stage about the second axis.

19. The optics system of claim 18, wherein the folded optics arrangement further comprises a lens group comprising one or more lens elements, and wherein the actuator arrangement is further configured to:

translate the lens group in at least a direction parallel to an optical axis of the lens group, wherein the optical axis is orthogonal to the plurality of axes about which actuator arrangement tilts the prism.

20. The optics system of claim 19, wherein the bearing suspension arrangement further comprises: a stage configured to move on ball bearings, wherein the stage suspends the lens group from the base structure and allows motion of the lens group enabled by the actuator arrangement.

* * * * *